US012706846B2

(12) United States Patent
Medagliani et al.

(10) Patent No.: US 12,706,846 B2
(45) Date of Patent: Aug. 11, 2026

(54) NETWORK DEVICE, SYSTEM AND METHOD FOR CYCLE-BASED LOAD BALANCING

(71) Applicant: Huawei Technologies Co., Ltd., Shenzhen (CN)

(72) Inventors: Paolo Medagliani, Boulogne Billancourt (FR); Sebastien Martin, Boulogne Billancourt (FR); Shuang Chen, Beijing (CN); Jeremie Leguay, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 17/936,337

(22) Filed: Sep. 28, 2022

(65) Prior Publication Data

US 2023/0017561 A1 Jan. 19, 2023

Related U.S. Application Data

(63) Continuation of application No. PCT/EP2020/059573, filed on Apr. 3, 2020.

(51) Int. Cl.
*H04L 47/125* (2022.01)
*H04L 45/00* (2022.01)

(52) U.S. Cl.
CPC ............ *H04L 47/125* (2013.01); *H04L 45/34* (2013.01)

(58) Field of Classification Search
None
See application file for complete search history.

(56) References Cited

U.S. PATENT DOCUMENTS

2002/0141343 A1* 10/2002 Bays .................. H04L 41/0894 370/235
2004/0141517 A1 7/2004 Balasubramanian et al.
(Continued)

FOREIGN PATENT DOCUMENTS

CN 105959399 A 9/2016
CN 109391556 A 2/2019
(Continued)

OTHER PUBLICATIONS

Wu, F. et al., "Design of RapidIO Logical Core Based on Safety Arbitration Mechanisms", 2010 Asia Pacific Conference on Post-graduate Research in Microelectronics and Electronics (PrimeAsia), Sep. 22-24, 2010, Beijing, China, 4 pages.
(Continued)

*Primary Examiner* — John A Follansbee
*Assistant Examiner* — Christopher P Cadorna
(74) *Attorney, Agent, or Firm* — Slater Matsil, LLP

(57) ABSTRACT

The present disclosure relates to the field of transport networks, packet-based network systems, and load balancing in such network systems. More specifically, the load balancing is performed on a network cycle level. The present disclosure provides a network device for cycle-based load balancing, configured to obtain a load balancing policy comprising an input cycle identifier and an associated output identifier. The network device is further configured to obtain a network packet in an input cycle of the network device, determine an output of the network device based on the input cycle, the input cycle identifier, and the associated output identifier, and provide the network packet to the output of the network device.

20 Claims, 20 Drawing Sheets

(56) References Cited

U.S. PATENT DOCUMENTS

| | | | | |
|---|---|---|---|---|
| 2006/0155862 | A1 | 7/2006 | Kathi et al. | |
| 2012/0207175 | A1* | 8/2012 | Raman | H04L 47/125 370/412 |
| 2013/0211789 | A1 | 8/2013 | Dong | |
| 2015/0326473 | A1 | 11/2015 | Dunbar et al. | |
| 2016/0006648 | A1* | 1/2016 | Saegusa | H04L 12/40182 370/236 |
| 2016/0020987 | A1 | 1/2016 | Wetterwald et al. | |
| 2016/0085837 | A1* | 3/2016 | Kotagiri | G06F 11/2094 707/634 |
| 2016/0219456 | A1* | 7/2016 | Shim | H04W 24/08 |
| 2018/0109450 | A1 | 4/2018 | Filsfils et al. | |
| 2019/0253357 | A1* | 8/2019 | Pathak | H04L 47/6215 |

FOREIGN PATENT DOCUMENTS

| | | | |
|---|---|---|---|
| CN | 110557340 | A | 12/2019 |
| JP | 2009508429 | A | 2/2009 |
| JP | 2012235409 | A | 11/2012 |
| JP | 2013143618 | A | 7/2013 |
| JP | 2014236367 | A | 12/2014 |
| WO | 2004051955 | A1 | 6/2004 |
| WO | 2014180418 | A1 | 11/2014 |
| WO | 2018120814 | A1 | 7/2018 |

OTHER PUBLICATIONS

IEEE Std 802.1CB-2017, "IEEE Standard for Local and metropolitan area networks-Frame Replication and Elimination for Reliability", Sep. 28, 2017, 102 pages.

Liu, J. et al., "A Multipath Routing Algorithm for Space Information Networks", Journal of Northeastern University (Natural Science), vol. 32, No. 6, Jun. 2011, with the English Abstract, 4 pages.

IEEE Std 802.1Qch-2017, "IEEE Standard for Local and metropolitan area networks-Bridges and Bridged Networks—Amendment 29: Cyclic Queuing and Forwarding", May 18, 2017, 30 pages.

Chen, M. et al., "Segment Routing (SR) Based Bounded Latency draft-chen-detnet-sr-based-bounded-latency-00", Network Working Group Internet-Draft, Oct. 19, 2018, 23 pages.

Vanini, E. et al., "Let It Flow: Resilient Asymmetric Load Balancing with Flowlet Switching", 14th USENIX Symposium on Networked Systems Design and Implementation (NSDI 17), Mar. 27-29, 2017, Boston, MA, US, 15 pages.

Thaler, D. et al., "Multipath Issues in Unicast and Multicast Next-Hop Selection", Network Working Group, Request for Comments: 2991, Nov. 2000, 9 pages.

Farrel, A. et al., "A Path Computation Element (PCE)-Based Architecture", Network Working Group, Request for Comments: 4655, Aug. 2006, 40 pages.

* cited by examiner

| Flow ID | Segment failure | Burst protection | Port_In | Cycle_In | Port_out | Queue out | Load out |
|---|---|---|---|---|---|---|---|
| 1 | | N | Port 3 | Cycle 1 | Port 1 | Q4 | 1 pkt |
| 1 | | N | Port 3 | Cycle 1 | Port 2 | Q2 | 1 pkt |
| 2 | | N | Port 3 | Cycle 2 | Port 1 | Q1 | 1 pkt |
| 2 | | N | Port 3 | Cycle 2 | Port 1 | Q2 | 2 pkt |
| 2 | | Y | Port 3 | Cycle 2 | Port 2 | Q1 | 2 pkt |
| 2 | | Y | Port 3 | Cycle 2 | Port 2 | Q2 | 3-max pkt |
| 2 | $f_1$ | N | Port 3 | Cycle 1 | Port 2 | Q2 | * |
| **3** | | **N** | **Port 3** | **Cycle 2** | **Port 1** | **Q1** | * |
| **3** | | **N** | **Port 3** | **Cycle 3** | **Port 2** | **Q5** | * |

Installation of a buffer on *B* of size:

Max #packets by cycle x (Cycle length(primary path) – Cycle length (smallest backup path) – (#queues for DetNet –1))

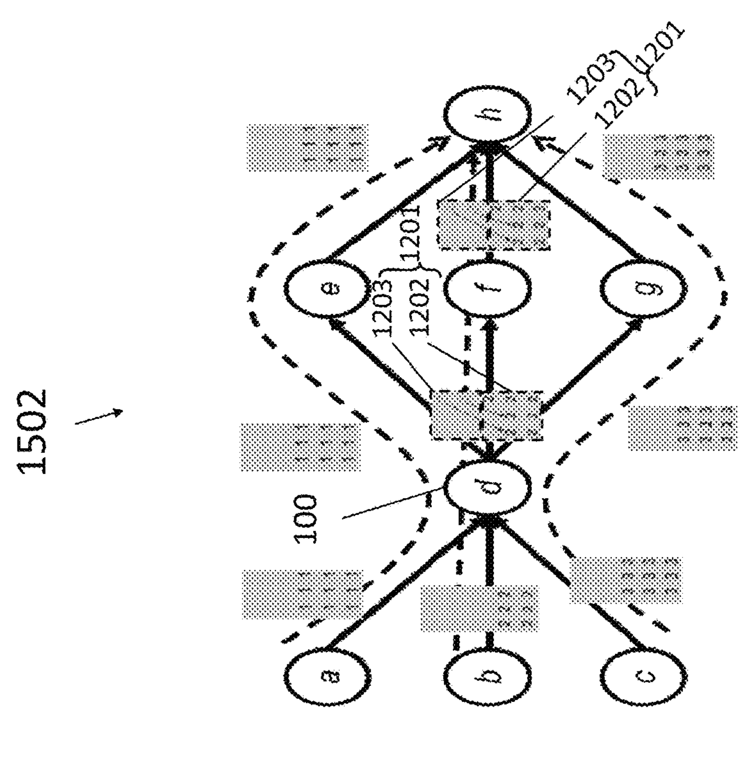
Fig. 15
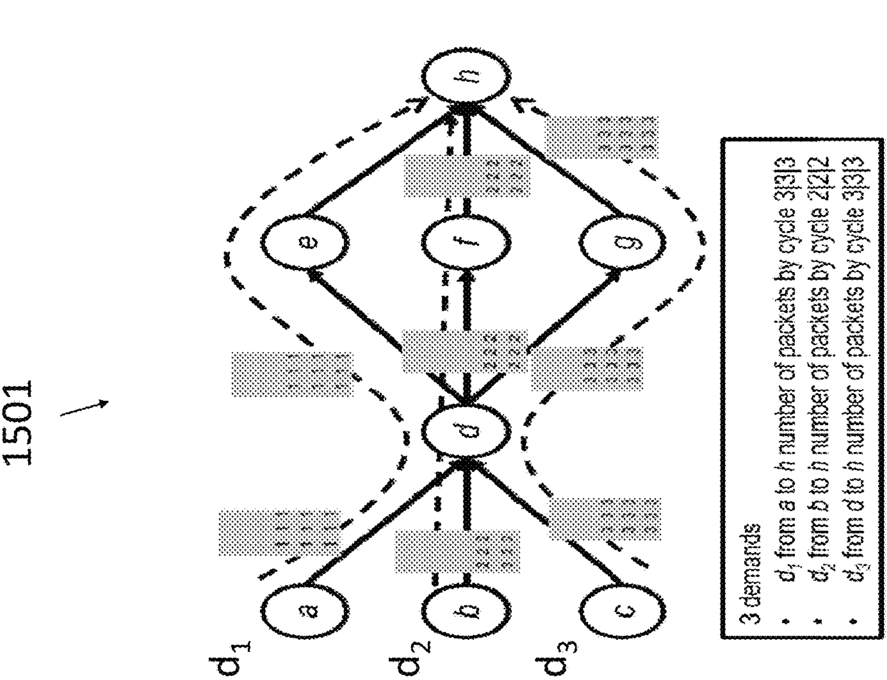

NETWORK DEVICE, SYSTEM AND METHOD FOR CYCLE-BASED LOAD BALANCING

CROSS-REFERENCE TO RELATED APPLICATIONS

This application is a continuation of International Application No. PCT/EP2020/059573, filed on Apr. 3, 2020, the disclosure of which is hereby incorporated by reference in its entirety.

TECHNICAL FIELD

The present disclosure relates to the field of transport networks, packet-based network systems, and load balancing in such network systems. More specifically, the load balancing is performed on a network cycle level. In particular, a network device for cycle-based load balancing is provided, as well as a corresponding system and method.

BACKGROUND

In a conventional network system, deterministic networking (DetNet) and time sensitive networking (TSN) guarantee quality of service (QoS) and limit end-to-end latency and jitter for time-critical applications. Latency is defined as a time interval between transmission of a packet at a source node and reception of the same packet at a destination node. Jitter is defined as a variation of end-to-end delay between consecutive packets.

In conventional network systems, two kinds of nodes are present: provider edge (PE) nodes and provider (P) nodes. To control forwarding of packets in a network node (e.g. a PE node or a P node), flow tables or segment routing (SR) policies can be used. In a flow table, each input port is associated with an output port (and a transmission cycle for DetNet) to which a flow is forwarded. In this case, forwarding rules must be installed in all intermediary devices processing a flow.

In the case of SR, a list of SR IDs (also called SIDs) is added to a packet by the PE nodes and is consumed by each intermediate P or PE node traversed by the packet. This list (also called label stack) determines routing (i.e. an outgoing port) and scheduling (i.e. an output transmission queue or an output transmission cycle) at each hop.

However, the use of a single path to route all network packets from a same flow results in poor network utilization. Typically, conventional load balancing is implemented inside network elements such as switches and routers, e.g. using hash-based splitting or weighted cost multi pathing (WCMP). In both cases, once a decision is taken for a flow, all packets from a flow must follow the same decision (same path). With equal cost multiple path (ECMP) or unequal cost multiple path (UCMP), it is possible to also split traffic over multiple paths.

However, as conventional load balancing can only be implemented on a per-path level, there is no solution for load balancing of deterministic network traffic with strict end-to-end requirements regarding jitter and delay. Moreover, in case of a network failure or the occurrence of bursts of network packets, conventional load balancing cannot meet strict end-to-end requirements regarding jitter and delay.

SUMMARY

In view of the above-mentioned problem, an objective of embodiments of the present disclosure is to improve the conventional load balancing solutions.

This or other objectives may be achieved by embodiments of the present disclosure as described in the enclosed independent claims. Advantageous implementations of embodiments of the present disclosure are further defined in the dependent claims.

In particular, embodiments of the present disclosure solve the problems of conventional load balancing by deciding how to route and schedule packets in a deterministic network depending on an input cycle, in which the network packet was received. In particular, an output port or an output cycle of the network packet can be determined based on the input cycle, in which the network packet was received, thereby meeting strict end-to-end requirements regarding jitter and delay.

A first aspect of the present disclosure provides a network device for cycle-based load balancing, configured to obtain a load balancing policy comprising an input cycle identifier and an associated output identifier; obtain a network packet in an input cycle of the network device; determine an output of the network device based on the input cycle, the input cycle identifier, and the associated output identifier; and provide the network packet to the output of the network device.

This is beneficial, as it allows for efficient load balancing over network links and over network cycles. Moreover, load balancing of deterministic traffic with strict requirements regarding jitter and delay is enabled.

In particular, the load balancing policy also comprises a routing policy.

In particular, the network packet is comprised by a network flow.

In particular, the network device is an ingress device of a network flow or an intermediary device of a network flow.

In particular, the network flow comprises a source address, a destination addresses, a source port, a destination port, and a transport protocol.

In an implementation form of the first aspect, the output comprises an output port, the output identifier comprises an output port identifier associated with the input cycle identifier, and the network device is further configured to determine the output port based on the output port identifier.

This is beneficial, as additionally, several output ports of the network device can be considered when making a load balancing decision.

In a further implementation form of the first aspect, the load balancing policy further comprises a load distribution indicator associated with the input cycle identifier, and wherein the network device is further configured to determine the output based on the load distribution indicator.

This is beneficial, as additionally, the load distribution indicator can be considered when making a load balancing decision.

In particular, the load distribution indicator indicates a relation between a number of packets and the output. In particular, the load distribution indicator indicates a relation between a relative amount of load and the output. In particular, the load distribution indicator indicates an output load at the output. In particular, the load distribution indicator is also associated with the output identifier.

In a further implementation form of the first aspect, the load balancing policy further comprises a flow table and the input cycle identifier comprises an input cycle field in the flow table.

This is beneficial, as additionally the input cycle field in the flow table can be considered when making a load balancing decision.

In a further implementation form of the first aspect, the output port identifier comprises an output port field in the flow table.

This is beneficial, as additionally the output port field in the flow table can be considered when making a load balancing decision.

In a further implementation form of the first aspect, the output comprises an output queue, the output identifier comprises an output queue identifier associated with the input cycle identifier, and the network device is further configured to determine the output queue based on the output queue identifier.

This is beneficial, as additionally the output queue can be considered when making a load balancing decision.

In particular the output queue identifier is an output queue field in the flow table.

In a further implementation form of the first aspect, the load distribution indicator comprises an output load field in the flow table, and wherein the network device is further configured to determine an output load based on the output load field.

This is beneficial, as additionally the output load field in the flow table can be considered when making a load balancing decision.

In a further implementation form of the first aspect, the load balancing policy further comprises a segment routing, SR, policy, and the input cycle identifier comprises an arrival cycle field in the SR policy.

This is beneficial, as additionally the arrival cycle field in the SR policy can be considered when making a load balancing decision.

In a further implementation form of the first aspect, the output identifier comprises a segment ID list in the SR policy.

This is beneficial, as additionally the segment ID list in the SR policy can be considered when making a load balancing decision.

In a further implementation form of the first aspect, the output further comprises an output cycle, the output identifier further comprises an output cycle identifier, and the network device is further configured to determine the output cycle based on the output cycle identifier.

This is beneficial, as a packet can be shifted to an output cycle different from the input cycle in which it was received, thereby allowing for load balancing or for mitigating a burst.

In particular, the output cycle identifier is a cycle shift identifier. In particular, the output cycle is different from the input cycle by the number of cycles that the input cycle is shifted as indicated by the cycle shift identifier. E.g. if the input cycle is "1" and the cycle shift identifier is "1", the output cycle is "2". E.g. if the input cycle is "1" and the cycle shift identifier is "2", the output cycle is "3".

In a further implementation form of the first aspect, the load distribution indicator comprises an output load field in the SR policy, and the network device is further configured to determine an output load based on the output load field.

This is beneficial, as additionally the output load field in the SR policy can be considered when making a load balancing decision.

In a further implementation form of the first aspect, the load balancing policy further comprises a burst condition identifier associated with the input cycle identifier, and the network device is further configured to, in reaction to a burst of network packets being received, determine the output based on the burst condition identifier.

This is beneficial, as additionally the output load field in the SR policy can be considered when making a load balancing decision.

In particular, the burst condition identifier identifies a rule in the load balancing policy suitable for burst protection. In particular, a burst of network packets is received if a predefined threshold of received network packets relating to a same flow is exceeded.

In a further implementation form of the first aspect, the load balancing policy further comprises a failure condition identifier associated with the input cycle identifier, wherein the network device is further configured to, in reaction to a failure condition being determined by the network device, determine the output based on the failure condition identifier.

This is beneficial, as additionally the failure condition identifier can be considered when making a load balancing decision. Thereby, the network device effectively can react to a determined failure condition.

In particular, the failure condition identifier identifies a rule in the load balancing policy suitable for failure protection. In particular, a failure condition is determined by the network device if a link failure along an intended path of the network packet is determined. In particular, a failure condition is determined if a node along an intended path of the network packet is not reachable by the network device.

In a further implementation form of the first aspect, the load balancing policy further comprises a load balancing condition identifier associated with the input cycle identifier, and the network device is further configured to determine the output based on the load balancing condition identifier.

This is beneficial, as additionally the load balancing condition identifier can be considered when making a load balancing decision. Thereby, the network device can make the load balancing decision dependent on the load balancing condition identifier and act more efficiently.

In particular, the load balancing condition identifier identifies a rule in the load balancing policy suitable for general load balancing. In particular, the load balancing condition identifier indicates a rule in the load balancing policy which is suitable when a network packet processed by the network device should be subject to load balancing in the network device.

In a further implementation form of the first aspect, the network device is further configured to determine the load balancing policy in the network device, and/or to obtain the load balancing policy from a network controller.

This is beneficial, as the network device can either operate independently from a network controller, thereby increasing flexibility. This is also beneficial, as alternatively, the network device can operate in cooperation with a network controller, thereby saving own resources.

In particular, the load balancing policy can be determined in the network device e.g. based on information obtained from distributed protocols, e.g. OSPF.

A second aspect of the present disclosure provides a method for cycle-based load balancing, the method comprising the steps of obtaining, by a network device, a load balancing policy comprising an input cycle identifier and an associated output identifier; obtaining, by the network device, a network packet in an input cycle of the network device; determining, by the network device, an output of the network device based on the input cycle, the input cycle identifier, and the associated output identifier; and providing, by the network device, the network packet to the output of the network device.

In an implementation form of the second aspect, the output comprises an output port, the output identifier comprises an output port identifier associated with the input cycle identifier, and the method further includes determining, by the network device, the output port based on the output port identifier.

In a further implementation form of the second aspect, the load balancing policy further comprises a load distribution indicator associated with the input cycle identifier, and the method further includes determining, by the network device, the output based on the load distribution indicator.

In a further implementation form of the second aspect, the load balancing policy further comprises a flow table and the input cycle identifier comprises an input cycle field in the flow table.

In a further implementation form of the second aspect, the output port identifier comprises an output port field in the flow table.

In a further implementation form of the second aspect, the output comprises an output queue, the output identifier comprises an output queue identifier associated with the input cycle identifier, and the method further includes determining, by the network device, the output queue based on the output queue identifier.

In a further implementation form of the second aspect, the load distribution indicator comprises an output load field in the flow table, and the method further includes determining, by the network device, an output load based on the output load field.

In a further implementation form of the second aspect, the load balancing policy further comprises a segment routing, SR, policy, and the input cycle identifier comprises an arrival cycle field in the SR policy.

In a further implementation form of the second aspect, the output identifier comprises a segment ID list in the SR policy.

In a further implementation form of the second aspect, the output further comprises an output cycle, the output identifier further comprises an output cycle identifier, and the method further includes determining, by the network device, the output cycle based on the output cycle identifier.

In a further implementation form of the second aspect, the load distribution indicator comprises an output load field in the SR policy, and the method further includes determining, by the network device, an output load based on the output load field.

In a further implementation form of the second aspect, the load balancing policy further comprises a burst condition identifier associated with the input cycle identifier, and the method further includes, in reaction to a burst of network packets being received, determining, by the network device, the output based on the burst condition identifier.

In a further implementation form of the second aspect, the load balancing policy further comprises a failure condition identifier associated with the input cycle identifier, and the method further includes, in reaction to a failure condition being determined by the network device, determining, by the network device, the output based on the failure condition identifier.

In a further implementation form of the second aspect, the load balancing policy further comprises a load balancing condition identifier associated with the input cycle identifier, and the method further includes determining, by the network device, the output based on the load balancing condition identifier.

In a further implementation form of the second aspect, and the method further includes determining, by the network device, the load balancing policy in the network device, and/or obtaining, by the network device, the load balancing policy from a network controller.

The second aspect and its implementation forms include the same advantages as the first aspect and its respective implementation forms.

A third aspect of the present disclosure provides a non-transitory computer-readable storage medium comprising instructions which, when executed by a computer, cause the computer to carry out the steps of the method of the second aspect or any of its implementation forms.

The third aspect and its implementation forms include the same advantages as the second aspect and its respective implementation forms.

A fourth aspect of the present disclosure provides a computer program product comprising instructions which, when the program is executed by a computer, cause the computer to carry out the steps of the method of the second aspect or any of its implementation forms.

The fourth aspect and its implementation forms include the same advantages as the second aspect and its respective implementation forms.

A fifth aspect of the present disclosure provides a system for cycle-based load balancing, comprising the network device according to the first aspect or any of its implementation forms, and a network controller, configured to generate the load balancing policy based on network traffic monitored by the network controller and to provide the load balancing policy to the network device.

In particular, the network controller is a deterministic networking (DetNet) network controller or a time sensitive networking (TSN) network controller.

In particular, the network controller is configured to monitor the network traffic by means of a protocol such as Common Control And Measurement Plane (CCAMP), Netflow, or Telemetry.

The fifth aspect and its implementation forms include the same advantages as the first aspect and its respective implementation forms.

In other words, embodiments of the present disclosure provide a deterministic load balancing solution over multiple network paths and multiple network cycles. Load balancing mechanism are provided to split a flow at packet-level over network paths and network cycles. Flow splitting can be implemented at head-end nodes or intermediary nodes of a network path. Embodiment of the present disclosure, therefore, enable efficient load balancing over links and over cycles, protection against bursts, and fast recovery after network failures. Load balancing decisions can either be taken at a local or a global level. Deterministic policies can be applied to load balance traffic over multiple paths/cycles. These policies e.g. can be computed at a centralized level and at a local level. At the centralized level, the controller computes new policies and sends them to the relevant nodes. At the local level entry or intermediate nodes can make a decision independently, to adjust policies based on the information they receive (e.g. from distributed protocols like OSPF). Load distribution policies can be implemented either by using SR policies distributed to the entry nodes, or by using flow tables specifying for each packet a mapping into a forwarding path and a transmission cycle.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above-described aspects and implementation forms of the present disclosure will be explained in the following description of specific embodiments in relation to the enclosed drawings, in which:

FIG. 15 shows a schematic view of a burst protection path computation algorithm;

DETAILED DESCRIPTION OF ILLUSTRATIVE EMBODIMENTS

Figure 1:
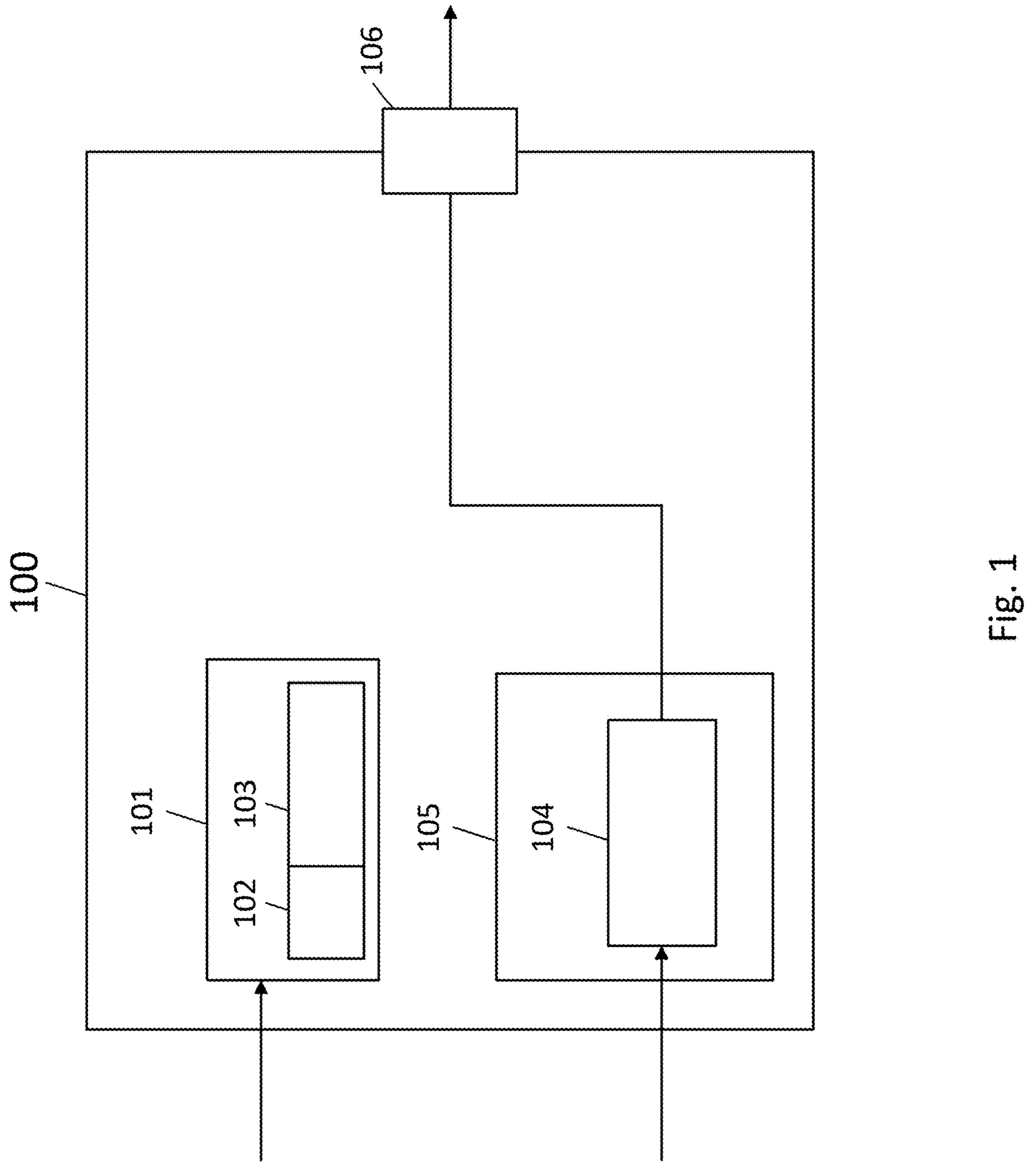
FIG. 1 shows a schematic view of a network device according to an embodiment of the present disclosure.

FIG. 1 shows a schematic view of a network device 100 according to an embodiment of the present disclosure. The network device 100 is configured for cycle-based load balancing, and, accordingly, is configured to obtain a load balancing policy 101 comprising an input cycle identifier 102 and an associated output identifier 103. The network device 100 is further configured to obtain a network packet 104 in an input cycle 105 of the network device 100 and to determine an output 106 of the network device 100 based on the input cycle 105, the input cycle identifier 102, and the associated output identifier 103. In other words, the input cycle identifier 102 in the load balancing policy 101 allows to process the received network packet 104 according to an input cycle 105 in which the network packet 104 was received. In particular, an output 106 for the network packet 104 is determined according to the input cycle 105 in which the network packet was received, based on the load balancing policy 101. Finally, the network device is configured to provide the network packet 104 to the output 106 of the network device 100.

Figure 2:
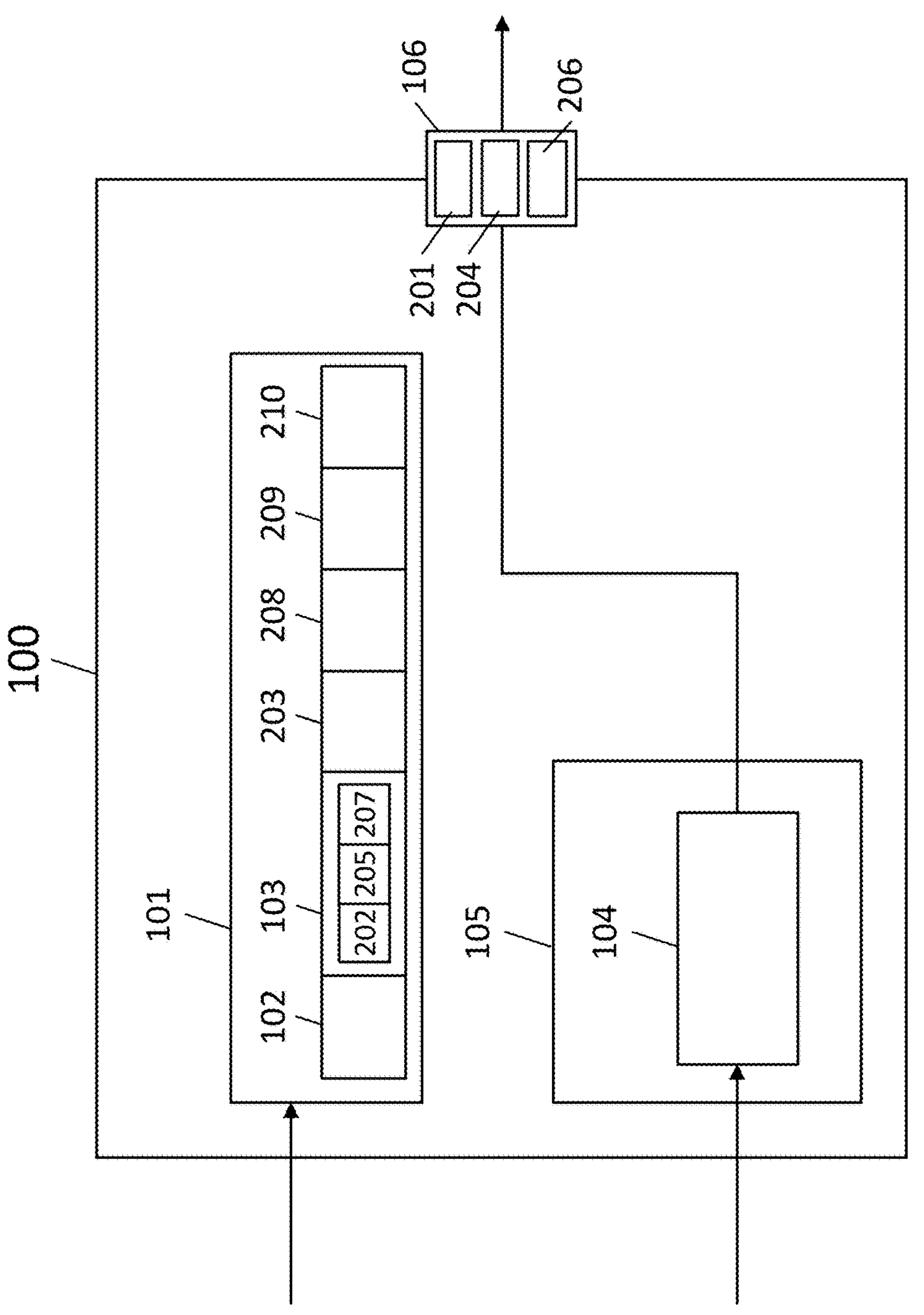
FIG. 2 shows a schematic view of a network device according to an embodiment of the present disclosure in more detail.

FIG. 2 shows a schematic view of network device 100 according to an embodiment of the present disclosure in more detail. The network device 100 shown in FIG. 2 comprises all features and functionality of the network device 100 of FIG. 1, as well as the following optional features.

As it is illustrated in FIG. 2, the output 106 optionally may comprise an output port 201 and the output identifier 103 optionally may comprise an output port identifier 202 associated with the input cycle identifier 102. The network device 100 optionally may further be configured to determine the output port 201 based on the output port identifier 202. In other words, the output 106 to which the network packet 104 is provided can be determined on an output port 201 level, according to the input cycle 105 in which the network packet 104 was received. The output port 201 may be a physical port of a network device. The output port 201 may also be an output port used in a network protocol.

As it is further illustrated in FIG. 2, the load balancing policy 101 optionally may further comprise a load distribution indicator 203 associated with the input cycle identifier 102. The network device 100 optionally may be configured to determine the output 106 based on the load distribution indicator 203. In other words, a ratio or an absolute amount of packets which are forwarded to the output during load balancing can be determined based on the load distribution indicator 203.

As it is further illustrated in FIG. 2, the output 106 optionally may comprises an output queue 204, the output identifier 103 optionally may comprise an output queue identifier 205 associated with the input cycle identifier 102, and the network device 100 optionally may further be configured to determine the output queue 204 based on the output queue identifier 205. In other words, the output queue identifier 205 allows to determine an output queue 204 which is used to send the network packet 104, depending on the input cycle 105 according to which the network packet 104 was received.

As it is further illustrated in FIG. 2, the output 106 optionally may comprise an output cycle 206, the output identifier 103 optionally may comprise an output cycle identifier 207, and the network device 100 optionally may be configured to determine the output cycle 206 based on the output cycle identifier 207. In other words, the output cycle identifier 207 allows to determine an output cycle 206 which is used to send the network packet 104, depending on the input cycle 105 according to which the network packet 104 was received.

As it is further illustrated in FIG. 2, the load balancing policy 101 optionally may comprise a burst condition identifier 208 associated with the input cycle identifier 102, and the network device 100 optionally may be configured to, in reaction to a burst of network packets being received, determine the output 106 based on the burst condition identifier 208. In other words, depending on a burst condition, a predefined output 106 may be selected for sending the network packet 104.

As it is further illustrated in FIG. 2, the load balancing policy 101 optionally may comprise a failure condition identifier 209 associated with the input cycle identifier 102, and the network device 100 optionally may be configured to, in reaction to a failure condition being determined by the network device 100, determine the output 106 based on the failure condition identifier 209. In other words, depending on a failure condition, a predefined output 106 may be selected for sending the network packet 104.

As it is further illustrated in FIG. 2, the load balancing policy 100 optionally may comprise a load balancing condition identifier 210 associated with the input cycle identifier 102, wherein the network device 100 optionally may be configured to determine the output 106 based on the load balancing condition identifier 210. In other words, the load balancing condition identifier 210 allows to indicate if load balancing is desired for a network packet 104 at hand, or if no load balancing needs to be applied.

All of the above mentioned features are applicable both when the load balancing policy 101 is a flow table, or a SR policy, as e.g. described in view of FIG. 4, respectively FIG. 6 below.

Figure 3:
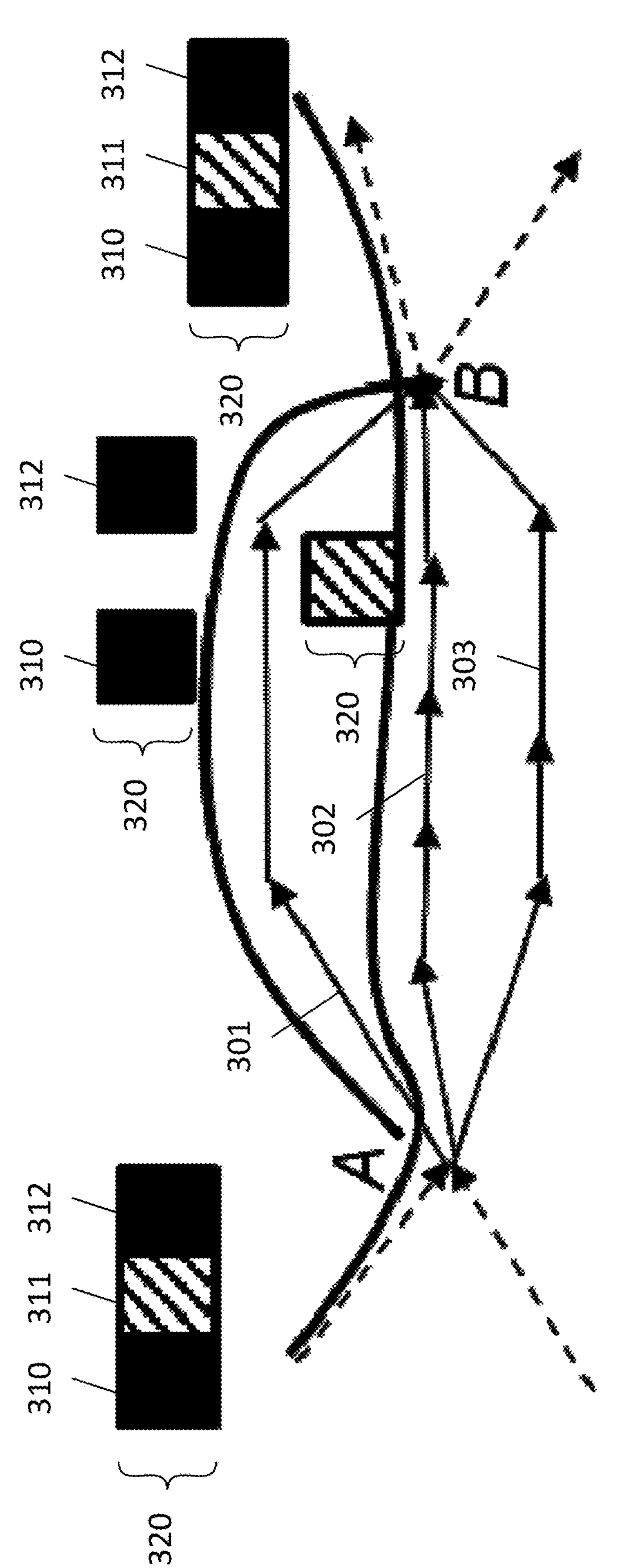
FIG. 3 shows a schematic view of load balancing along several network paths.

FIG. 3 illustrates load balancing (of e.g. DetNet or TSN traffic) over several paths 301, 302, 303 and over several cycles 310, 311, 312, as it is enabled by the network device 100. Packets of a same network flow 320 can be routed and scheduled over different paths 301, 302, 303. In FIG. 3, packets of network flow 320 in the first cycle 320 and the third cycle 312 are routed via path 301, while packets of network flow 320 in the second cycle 311 are routed via path 302.

Figure 4:
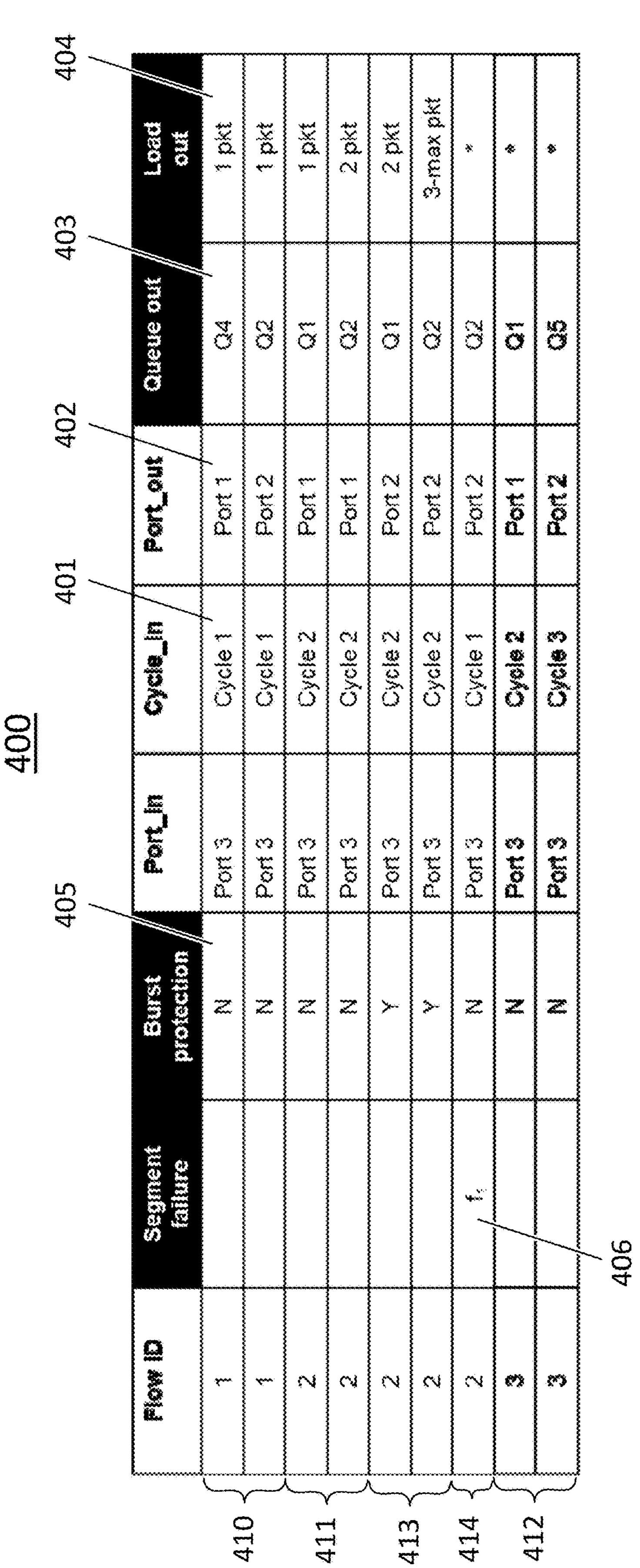
FIG. 4 shows a schematic view of a flow table used by the network device.

FIG. 4 shows a schematic view of a flow table 400 which can be used in the network device 100 according to FIG. 2. The load balancing policy 101 optionally may comprise the flow table 400 and the input cycle identifier 102 optionally may comprise an input cycle field 401 in the flow table 400. In other words, the load balancing policy 101 may be implemented by means of a flow table 400, while the input cycle identifier 102 may be implemented by means of the input cycle field 401. While in the flow table 400 only one input cycle field 401 is labelled with a reference sign, the above teaching however applies to any of the cycles shown in the column labelled "Cycle_in" in FIG. 4.

As it is further illustrated in FIG. 4, the output port identifier 202 optionally may comprise an output port field 402 in the flow table 400. In other words, the output port identifier may be implemented by means of the output port field 402. While in the flow table 400 only one output port field 402 is labelled with a reference sign, the above teaching however applies to any of the ports shown in the column labelled "Port_out" in FIG. 4.

As it is further illustrated in FIG. 4, the output queue identifier 205 optionally may be an output queue field 403 in the flow table 400 and the network device 100 optionally may further be configured to determine the output queue 204 based on the output queue field 403. In other words, the output queue identifier 205 may be implemented by means of the output queue field 403. While in the flow table 400 only one output queue field 403 is labelled with a reference sign, the above teaching however applies to any of the queues shown in the column labelled "Queue out" in FIG. 4.

As it is further illustrated in FIG. 4, the load distribution indicator 203 optionally may be an output load field 404 in the flow table 400 and the network device 100 optionally may further be configured to determine an output load based on the output load field 404. In other words, the load distribution indicator 203 may be implemented by means of the output load field 404. While in the flow table 400 only one output load field 404 is labelled with a reference sign, the above teaching however applies to any of the items shown in the column labelled "Load out" in FIG. 4.

As it is further illustrated in FIG. 4, the burst condition identifier 208 optionally may be an burst protection field 405 in the flow table 400 and the network device 100 optionally may be configured to determine the output 106 based on the burst protection field 405. In other words, the burst condition identifier 208 may be implemented by means of the burst protection field 405. While in the flow table 400 only one burst protection field 405 is labelled with a reference sign, the above teaching however applies to any of the items shown in the column labelled "Burst protection" in FIG. 4.

As it is further illustrated in FIG. 4, the failure condition identifier 209 optionally may be a failure protection field 406 in the flow table 400 and the network device 100 optionally may be configured to determine the output 106 based on the failure protection field 406. In other words, the failure condition identifier 208 may be implemented by means of the failure protection field 406. While in the flow table 400 only one failure protection field 406 is labelled with a reference sign, the above teaching however applies to any of the items shown in the column labelled "Segment failure" in FIG. 4.

That is, a flow table 400 is extended in order to support cycle-level load balancing. In FIG. 4, it is shown how it is possible to support cycle-level load balancing by adding specific fields that allow identifying the input cycle (Cycle_in 401), the output queue (Queue_out 402), and the target split ratio (Load out 404). The flow table 400 describes the output load with a number of packets. However, the field "Load out" can also be determined by load balancing weights, which represent a percentage of the cycle capacity.

According to an example 410 shown in FIG. 4, it is described how cycle-level load balancing is implemented. Flow 1, which is expected to be received in port 3, cycle 1, is split over two paths, sending one packet on port 1, queue 4 and one packet on port 2, queue 2.

According to example 411, flow 2 is split over two cycles, sending 1 packet over port 2, queue 1 and one packet over port 2, queue 2.

According to example 412 for flow 3, the traffic received from port 3, cycle 2 is entirely forwarded to port 1, queue 1 and the one received in port 3, cycle 3 is entirely forwarded to port 2, queue 5.

According to FIG. 4, burst protection is implemented in example 413 (those rules marked with "Y"). In this case, it is assumed that it is a-priori known which is the maximum burst size of each flow. This assumption is realistic, as flow shaping is normally carried out at ingress nodes in a network. In addition, it is assumed that a Maximum Transmission Unit (MTU) of the packets within a flow is known. In this case, whenever a burst of traffic is detected, the flow with the burst is split in the following way: 2 packets on port 2, queue 1 and the remaining packets (3 packets up to the maximum) over port 2, queue 2. The same applies also for the weight-based load balancing. It is only required to replace the content of the "Load out" column with weights (i.e. packet values are replaced with relative values, e.g.

noted in percent). The burst detection can e.g. be implemented by measuring if traffic exceeds a given threshold. In such a case, the burst protection rule is activated as described above.

Figure 5:
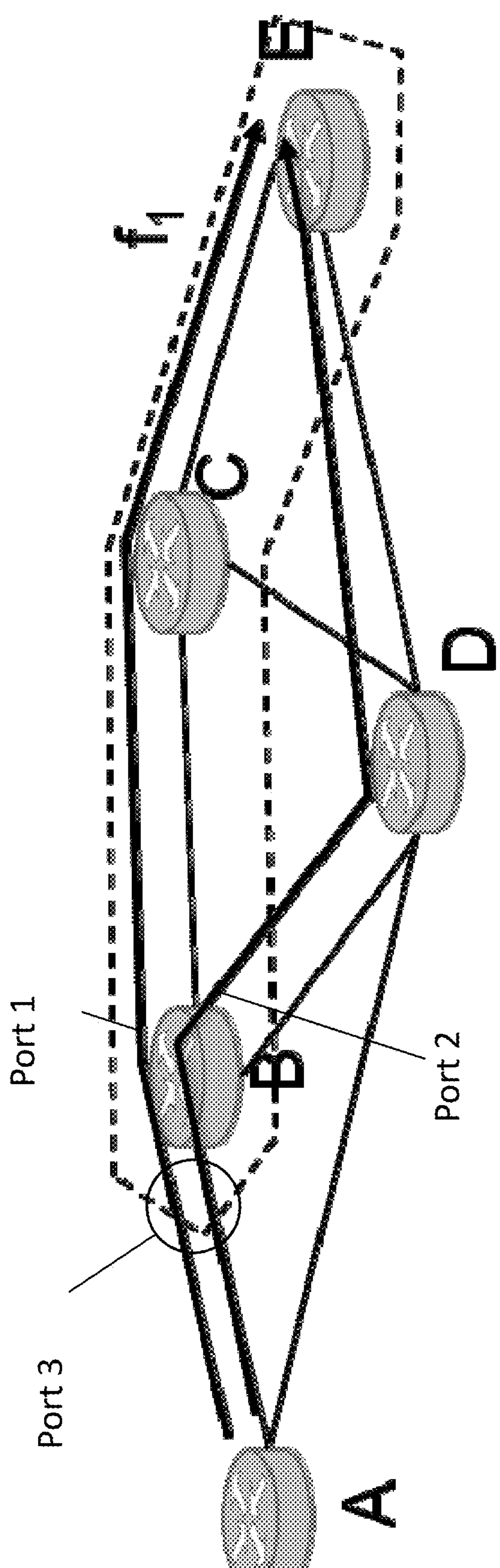
FIG. 5 shows a schematic view of failure recovery enabled by the network device.

As it is e.g. illustrated in FIG. 5, network failures can be identified at a link level (cf. "$f_1$" in FIG. 5, or at a level of a Shared Risk Link Group (SRLG), i.e. groups of links that may fail together, following an unexpected event. In FIG. 4, the example in row 414 in the flow table 400 allows to specify for a given failure $f_1$ if a rule must be activated. That is, $f_1$ e.g. can be the failure condition identifier 209. This is in line with the illustration in FIG. 5: Once node B detects a failure, it activates rule 414 of the flow table 400 and the traffic of flow 2 (which is received at port 3 of node B) is redirected from port 1 to port 2, queue 2 (thereby routing a respective packet from node B via node D to node E. The same also applies also for weight-based load balancing.

Figure 6:
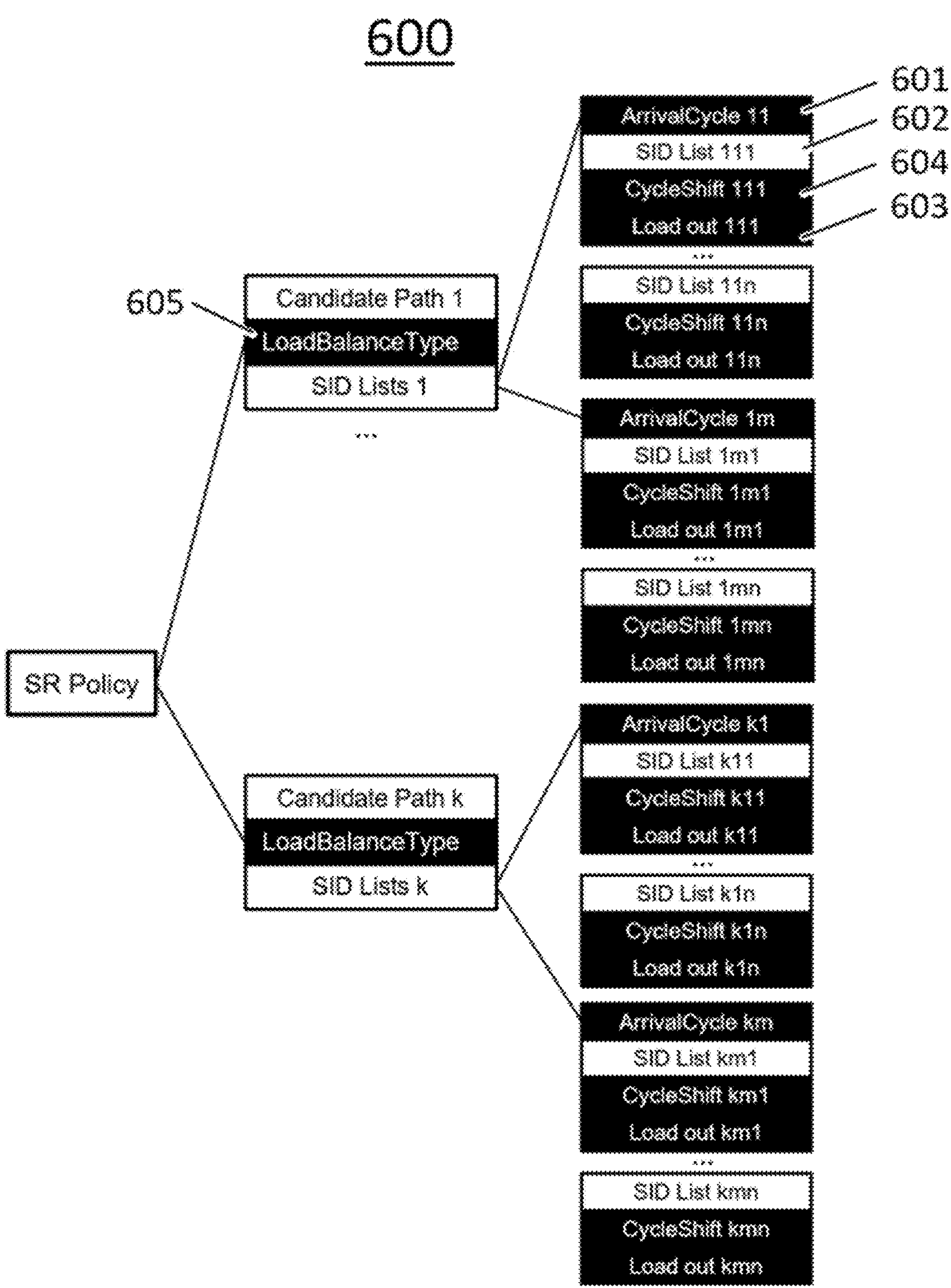
FIG. 6 shows a schematic view of a SR policy list used by the network device.

FIG. 6 shows a schematic view of a SR policy 600 which can be used by the network device 100 of FIG. 2.

As it is illustrated in FIG. 6, the load balancing policy 101 optionally may comprise a SR policy 600, and the input cycle identifier 102 optionally may comprise an arrival cycle field 601 in the SR policy 600. In other words, the load balancing policy may be implemented by means of the SR policy and the input cycle identifier 102 may be implemented by means of the arrival cycle field 601. While in the SR policy 600 only one arrival cycle field 601 is labelled with a reference sign, the above teaching however applies to any of the arrival cycles shown in the SR policy being labelled "ArrivalCycle" in FIG. 6.

As it is further illustrated in FIG. 6, the output identifier 103 optionally may comprises a segment ID list 602 in the SR policy 600. In other words, the output identifier 103 may be implemented by means of the segment ID list 602. While in the SR policy 600 only one segment ID list 602 is labelled with a reference sign, the above teaching however applies to any of the segment ID lists shown in the SR policy being labelled "SID List" in FIG. 6.

As it is further illustrated in FIG. 6 the load distribution indicator 203 optionally may comprise an output load field 603 in the SR policy 600, and the network device 100 optionally may be configured to determine an output load based on the output load field 601. In other words, the load distribution indicator 203 is implemented by means of the output load field 603. While in the SR policy 600 only one output load field 603 is labelled with a reference sign, the above teaching however applies to any of the output load fields shown in the SR policy being labelled "Load out" in FIG. 6.

As it is further illustrated in FIG. 6, the output cycle identifier 206 optionally may be a cycle shift identifier 604 in the SR policy 600. In other words, the output cycle identifier 206 may be implemented by means of the cycle shift identifier 604. While in the SR policy 600 only one cycle shift identifier 604 is labelled with a reference sign, the above teaching however applies to any of the cycle shift identifiers shown in the SR policy being labelled "CycleShift" in FIG. 6.

As it is further illustrated in FIG. 6, the burst condition identifier 208 optionally may be a load balance type identifier 605 in the SR policy 600 and the network device 100 optionally may further be configured to determine the output 106 based on the load balance type identifier 605. The load balance type identifier 605 in this case may be of a predefined value (e.g. "1") indicating the burst condition. In other words, the burst condition identifier 208 may be implemented by means of the load balance type identifier 605. While in the SR policy 600 only one load balance type identifier 605 is labelled with a reference sign, the above teaching however applies to any of the items shown in SR policy 600 labelled "LoadBalance Type" in FIG. 6.

As it is further illustrated in FIG. 6, the failure condition identifier 209 optionally may be a load balance type identifier 605 in the SR policy 600 and the network device 100 optionally may be configured to determine the output 106 based on the load balance type identifier 605. The load balance type identifier 605 in this case may be of a predefined value (e.g. "2") indicating the failure condition. In other words, the failure condition identifier 209 may be implemented by means of the load balance type identifier 605.

As it is further illustrated in FIG. 6, the load balancing condition identifier 210 optionally may be a load balance type identifier 605 in the SR policy 600 and the network device 100 optionally may be configured to determine the output 106 based on the load balance type identifier 605. The load balance type identifier 605 in this case may be of a predefined value (e.g. "0") indicating the load balancing condition. In other words, the load balancing condition identifier 210 may be implemented by means of the load balance type identifier 605.

According to the above described extensions to SR policies 600, cycle-level based load balancing for deterministic traffic is supported. The fields according to embodiments of the present disclosure which are introduced in the SR policy 600 are colored in black in FIG. 6. Generally, an SR policy 600 is a decision tree that is applied to each network packet 104 incoming in ingress nodes (e.g. the network device 100) of a network to determine the label stack (i.e. the SID list) to inject in packet headers. For each network packet 104, according to the status of the action to be taken and its arrival cycle 105 within the node (i.e. the network device 100), a SID list is selected. This allows to implement routing inside the network. According to a shift and load distribution, the network packet 104 is then affected to one of the output ports 201 and inserted in one of the available transmission queues 204.

Figure 7:
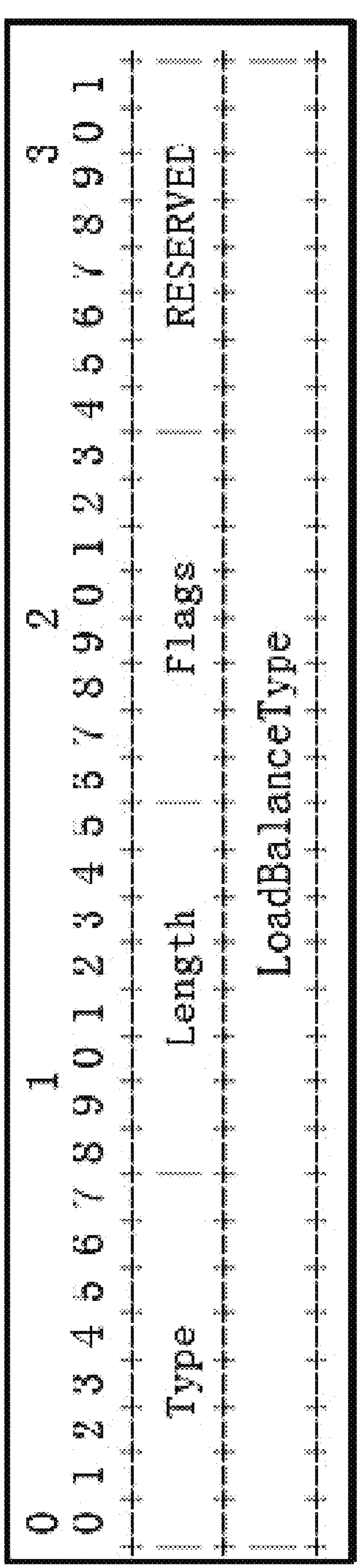
FIG. 7 shows a schematic view of a LoadBalanceType TLV format.

An example of the load balance type identifier 605 is now going to be described with respect to FIG. 7. In FIG. 7, the load balance type identifier 605 can be embodied as a LoadBalanceType Type-Length-Value (TLV) that identifies if the SR policy 600 has been conceived for (i) cycle-level load balancing, (ii) burst management, or (iii) failure recovery. In case of cycle-level load balancing, an associated value is "0", in case of burst management, an associated value is "1", and in case of failure recovery an associated value is "2".

Figure 8:
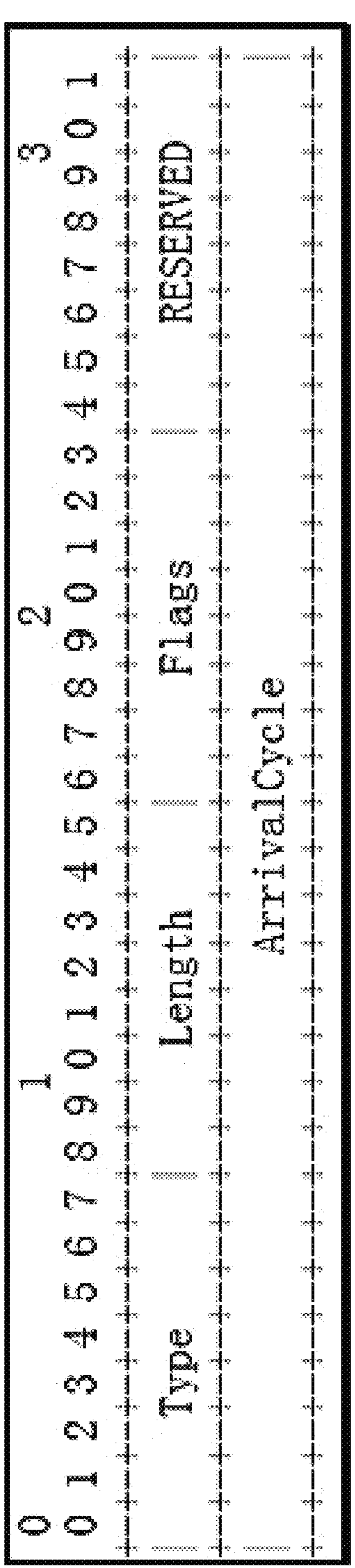
FIG. 8 shows a schematic view of an ArrivalCycle TLV format.

An example of the arrival cycle field 601 is now going to be described with respect to FIG. 8. The SR policy 600 allows defining, according to the arrival cycle field 601, a list of IDs to be used and the associated split (Load out field). As long as a flow can send packets over several cycles, a SR list per cycle is defined (e.g., ArrivalCycle 11-ArrivalCycle 1 m in FIG. 6). This information is held in the ArrivalCycle TLV, as shown in FIG. 8.

Figure 9:
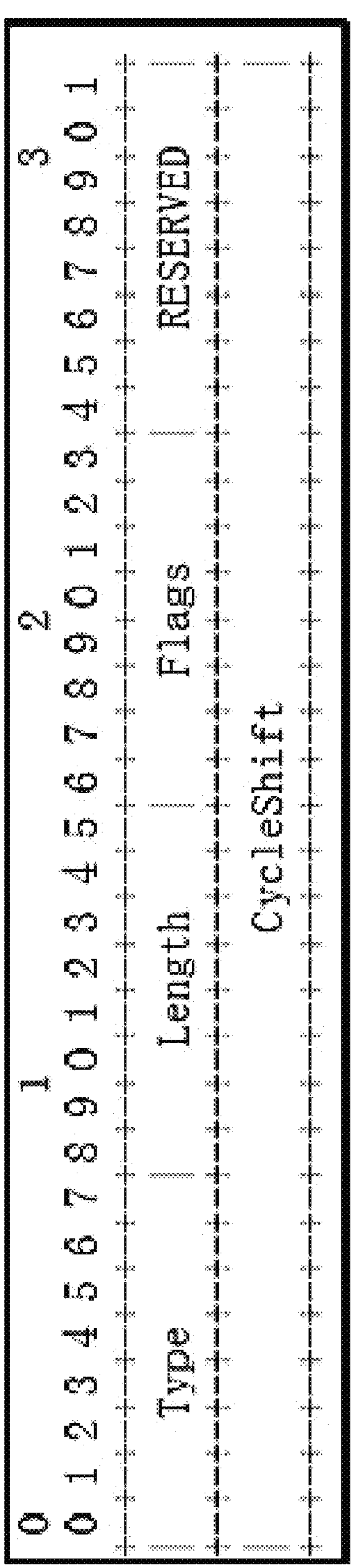
FIG. 9 shows a schematic view of a CycleShift TLV format.

An example of the cycle shift identifier 604 is now going to be described with respect to FIG. 9. The SR policy also may require a CycleShift TLV (being the cycle shift identifier 604) to determine, which scheduling is applied to each network packet at a network node. The cycle shift identifier 604, in particular, indicates to which output cycle a network packet is scheduled, relative to the input cycle 105 in which it was received.

Figure 10:
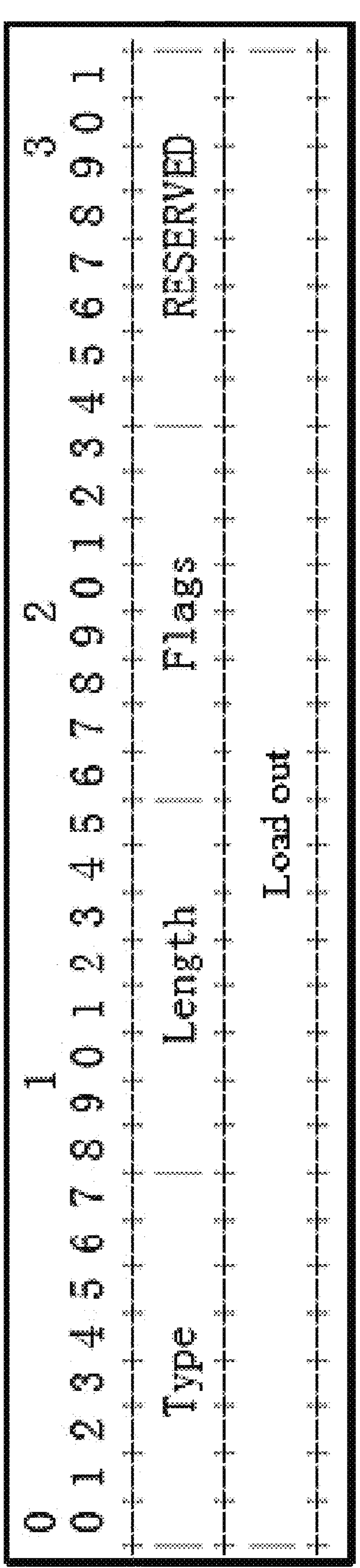
FIG. 10 shows a schematic view of a Load out TLV format.

An example of the output load field 603 is now going to be described with respect to FIG. 10. The output load field 603 can be implemented as a Load out TLV to split the frames within the same input cycle 105 over multiple outgoing paths and cycles. The Load out TLV contained in the SR policy 600 can be expressed as a number of packets or a percentage of the cycle capacity.

Figure 11:
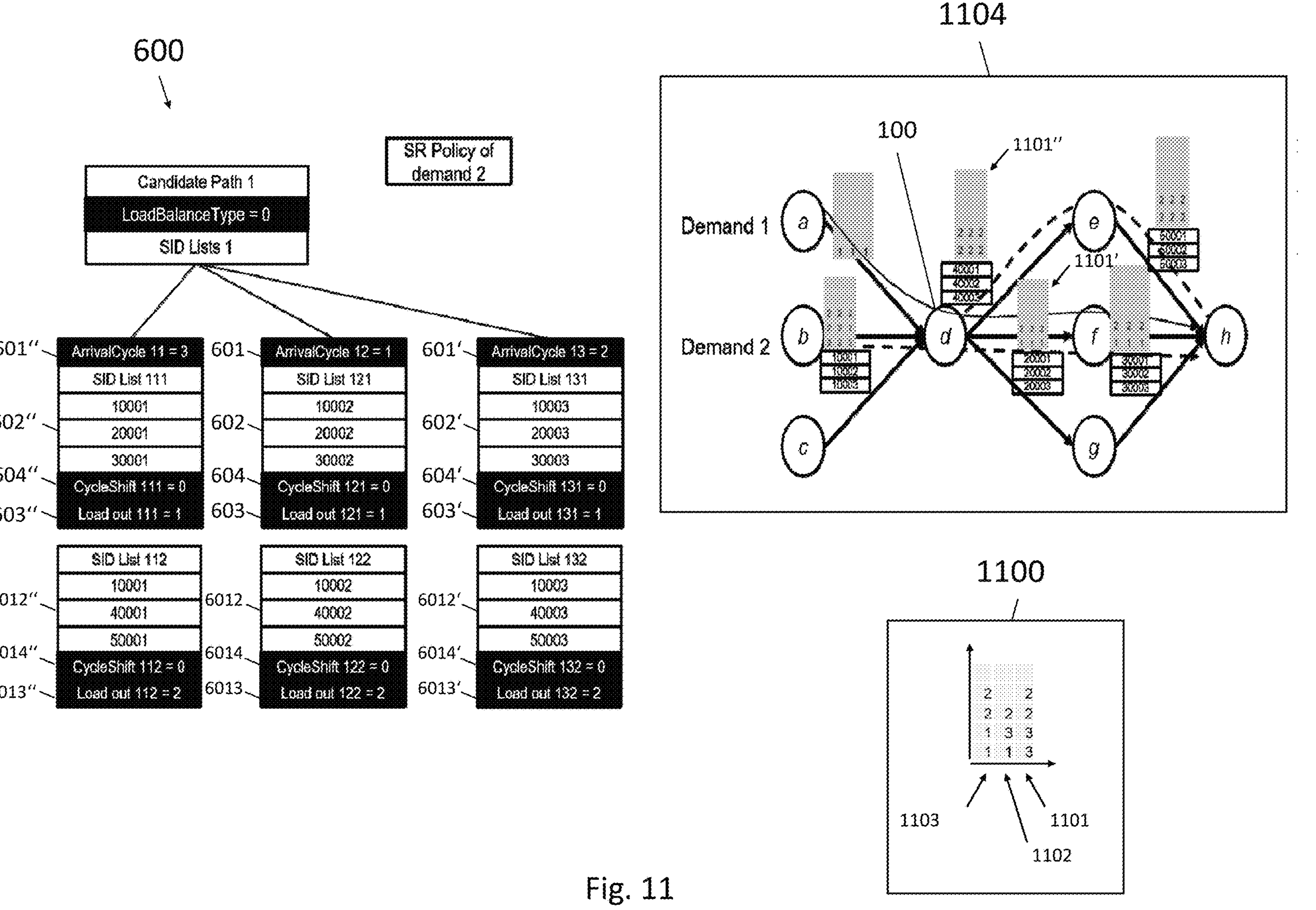
FIG. 11 shows a schematic view of a load balancing scenario with SR policies.
Figure 12:
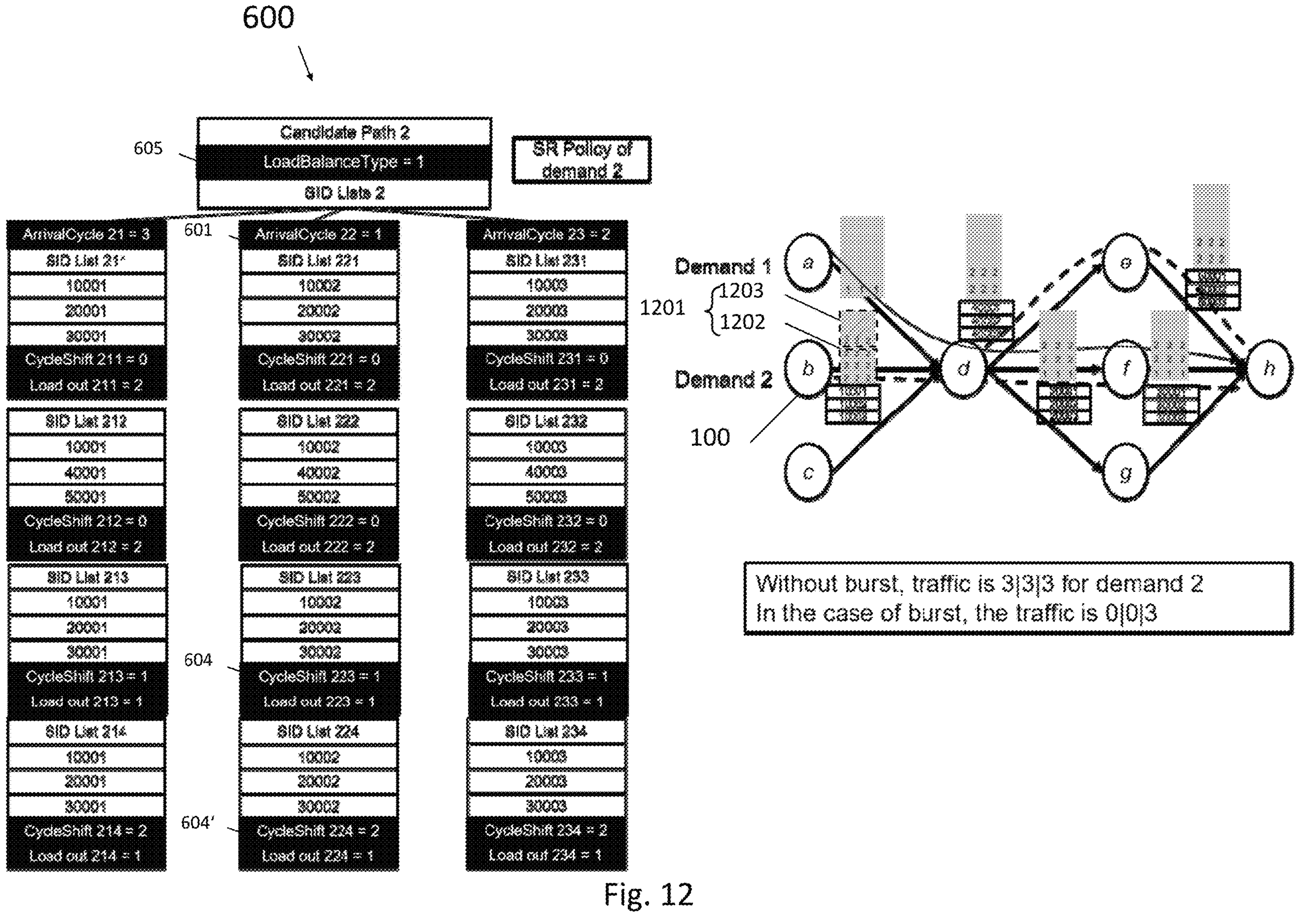
FIG. 12 shows a schematic view of a burst protection scenario with SR policies.
Figure 13:
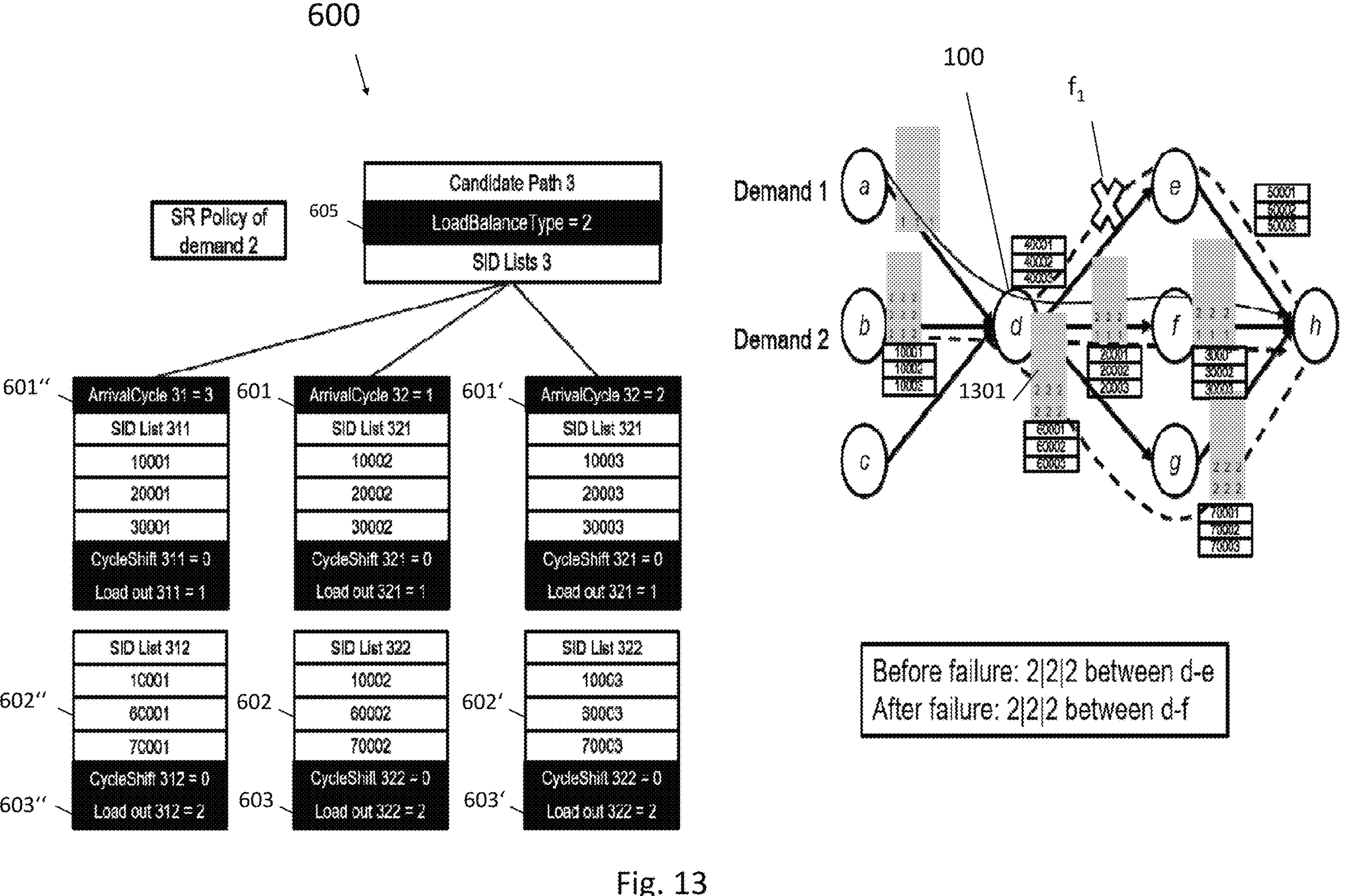
FIG. 13 shows a schematic view of a failure recovery scenario with SR policies.

Referring to FIG. 11, FIG. 12, and FIG. 13, three use cases are now going to be described which can be addressed by the cycle-level load balancing mechanism implemented by the network device 100: load balancing of packets (FIG. 11), burst protection (FIG. 12), and fast failure recovery (FIG. 13).

FIG. 11 illustrates how a load balancing problem is solved using an SR policy 600.

Section 1100 of FIG. 11 shows a table which is used to describe network packets 104 that relate to different cycles. Each column 1101, 1102, 1103 relates to a different cycle. Column 1101 relates to cycle 1 and comprises two packets relating to a demand "2", and two packets relating to a demand "3". Column 1102 relates to cycle 2 and comprises one packet relating to a demand "1", one packet relating to the demand "3", and one packet relating to the demand "2". Column 1103 relates to cycle 3 and comprises two packets relating to the demand "1", and two packets relating to demand "2". This table 1100 generally applies to segment routing as described in FIGS. 11, 12, 13, 14, 15, and 16.

In section 1104, load-balanced segment routing according to the present disclosure is illustrated. The network device 100 according to the present disclosure is thereby e.g. implemented by node d in section 1104.

In section 1104, node b transmits network packets 104 to node d. Three network packets 104 relating to a demand "2" are transmitted in cycle 1. Another three network packets 104 relating to the demand "2" are transmitted in cycle 2, and another three network packets 104 relating to the demand "2" are transmitted in cycle 3. Further, node a transmits network packets 104 to node d. One network packet 104 relating to a demand "1" is transmitted in cycle 1. Another network packet 104 relating to the demand "1" is transmitted in cycle 2, and another network packet 104 relating to the demand "1" is transmitted in cycle 3.

That is, node d (i.e. the network device 100) receives four network packets 104 in each of cycles 1, 2 and 3. The information in the SR policy 600, which is also illustrated in FIG. 11, is used to transmit these network packets 104 to node h, wherein the load of network packets 104 is balanced over path d, e, h and over path d, f, h. For ease of illustration, the shown SR policy 600 only applies to demand "2" of FIG. 11. The same operating principle however also applies to the network packets 104 of demand "1".

As it is illustrated in table 1101' (which complies with the general description of table 1100) in section 1104, in cycle 1, a network packet 104 relating to demand "2" is forwarded from node d to node f. The output 106 of node d for forwarding this network packet 104 to node f can, in particular, be chosen based on the arrival cycle field 601 and on segment ID List 602 (in particular on SID "20002"). Moreover, an output load can be determined based on output load field 603. As the value of the output load field 603 is "1", one out of the three network packets 104 that arrived in cycle 1 and that relate to demand "2" is forwarded to node f in cycle 1. The cycle shift identifier 604 being "0" in FIG. 11 indicates that the output cycle 206 for transmitting the network packet 104 is the same as the input cycle 105 of this network packet 104, that is, cycle 1.

As it is further illustrated in table 1101' in FIG. 11, in cycle 2, a network packet 104 relating to demand "2" is forwarded from node d to node f. The output 106 of node d for forwarding this network packet 104 to node f can, in particular, be chosen based on the arrival cycle field 601' and on segment ID List 602' (in particular on SID "20003"). Moreover, an output load can be determined based on output load field 603'. As the value of the output load field 603' is "1", one out of the three network packets 104 that arrived in cycle 2 and that relate to demand "2" is forwarded to node f. The cycle shift identifier 604' being "0" in FIG. 11 indicates that the output cycle 206 for transmitting the network packet 104 is the same as the input cycle 105 of this network packet 104, that is, cycle 2.

As it is further shown by table 1101' in FIG. 11, in cycle 3, a network packet 104 relating to demand "3" is forwarded from node d to node f. The output 106 of node d for forwarding this network packet 104 to node f can, in particular, be chosen based on the arrival cycle field 601" and on segment ID List 602" (in particular on SID "20001"). Moreover, an output load can be determined based on output load field 603". As the value of the output load field 603" is "1", one out of the three network packets 104 that arrived in cycle 2 and that relate to demand "2" is forwarded to node f. The cycle shift identifier 604" being "0" in FIG. 11 indicates that the output cycle 206 for transmitting the network packet 104 is the same as the input cycle 105 of this network packet 104, that is, cycle 3.

As it is further illustrated in table 1101' of FIG. 11, a similar processing of network packets as described above applies to the network packets 104 that relate to demand "1" in each of cycles 1, 2 and 3. The network packet 104 that belongs to demand "1" and was received in cycle 1 at node d is provided to node f in cycle 1. The network packet 104 that belongs to demand "1" and was received in cycle 2 at node d is provided to node f in cycle 2. The network packet 104 that belongs to demand "1" and was received in cycle 3 at node d is provided to node f in cycle 3.

That is, according to the notation in table 1101', half of the load that is received at node d is provided to node h via path d, f, h. The second half of the load that is received at node d is provided to node h via path d, e, h. In FIG. 11, this is illustrated by table 1101".

As it is illustrated in table 1101" (which complies with the general description of table 1100) in section 1104, two network packets 104 relating to demand "2" are forwarded from node d to node e in cycle 1. The output 106 of node d for forwarding these network packets 104 to node e can, in particular, be chosen based on the arrival cycle field 601 and on segment ID List 6012 (in particular on SID "40002"). Moreover, an output load can be determined based on output load field 6013. As the value of the output load field 6013 is "2", two out of the three network packets 104 that arrived in cycle 1 and that relate to demand "2" are forwarded to node e. The cycle shift identifier 6014 being "0" in FIG. 11 indicates that the output cycle 206 for transmitting the network packet 104 is the same as the input cycle 105 of this network packet 104, that is, cycle 1.

As it is further shown by table 1101" in FIG. 11, two network packets 104 relating to demand "2" are forwarded from node d to node e in cycle 2. The output 106 of node d for forwarding these network packets 104 to node e can, in particular, be chosen based on the arrival cycle field 601' and on segment ID List 6012' (in particular on SID "40003"). Moreover, an output load can be determined based on output load field 6013'. As the value of the output load field 6013' is "2", two out of the three network packets 104 that arrived in cycle 2 and that relate to demand "2" are forwarded to node e. The cycle shift identifier 6014' being "0" in FIG. 11 indicates that the output cycle 206 for transmitting the network packet 104 is the same as the input cycle 105 of this network packet 104, that is, cycle 2.

As it is further illustrated in table 1101" in FIG. 11, two network packets 104 relating to demand "3" are forwarded from node d to node e in cycle 3. The output 106 of node d for forwarding these network packets 104 to node e can, in particular, be chosen based on the arrival cycle field 601" and on segment ID List 6012" (in particular on SID "40001"). Moreover, an output load can be determined based on output load field 6013". As the value of the output load field 603" is "2", two out of the three network packets 104 that arrived in cycle 3 and that relate to demand "2" are forwarded to node e. The cycle shift identifier 6014" being "0" in FIG. 11 indicates that the output cycle 206 for transmitting the network packet 104 is the same as the input cycle 105 of this network packet 104, that is, cycle 3.

The forwarding of demands 1 and 2 from node f to node h may be implemented by conventional segment routing. The forwarding of demand 2 from node e to node h may be implemented by conventional segment routing.

In other words, the SR policy 600 in FIG. 11 allows to load-balance the traffic for demand 2 over two different paths (i.e. path b, d, f, h and path b, d, e, h). For the packets in each cycle, a split 1-2 is applied. The corresponding SID lists are attached to each packet, in order to let node d to route traffic on the right interface. For instance, the 3 packets in the cycle 11 (being labelled with reference sing 601") are split in the following way: 2 over the link d-e by using the SID 40001 and 1 over the link d-f by using the SID 20001. After this load balancing decision, the load of links is better distributed and a Maximum Link Utilization (MLU) is reduced.

FIG. 12 illustrates how burst protection is provided using an SR policy 600. In FIG. 12, the SR policy 600 can be used by node b (which implements the network device 100) to move network packets 104 to an output cycle 206 different from an input cycle 105 in which they were received, to mitigate bursts of network packets 104. In FIG. 12, table 1201 is used to describe processing of network packets 104 at node b. The description of table 1100 in FIG. 11 also applies to table 1201 of FIG. 12.

Table 1201 comprises a section 1202 of network packets 104 relating to regular traffic, and a section 1203 of network packets 104 that arrive at node b (that is, at the network device 100) during a burst condition.

As it is illustrated in section 1202, during normal operation in cycle 1, three packets relating do demand "2" arrive at node b. In cycle 2, also three packets relating do demand "2" arrive at node b. Finally, in cycle 3, again three packets relating do demand "2" arrive at node b. In other words, in a normal operating condition, traffic is 3|3|3 for demand "2".

However, when a burst condition appears (as illustrated together in sections 1202 and 1203), six packets relating to demand "2" arrive at node b in cycle 1, while three packets relating to demand "2" arrive in cycle 2 and three packets relating to demand "2" arrive in cycle 3. In other words, the incoming burst is 0|0|3, in addition to the regular traffic being 3|3|3. According to the present disclosure, the exceeding traffic caused by the burst can be distributed to these cycles, in which no burst of network packets 104 is received.

As it is illustrated in section 1203, one of the three network packets 104 that relate to demand "2" and are received during the burst condition is moved from cycle 1 to cycle 2. That is, this network packet 104 was received in the first input cycle 105 and will be output in the second output cycle 206. Node b (i.e. the network device 100) can base this decision in particular on the arrival cycle field 601 and on the cycle shift identifier 604 of the SR policy 600. The cycle shift identifier 604 being set to "1" in particular indicates that the network packet 104 is shifted from the first input cycle 105 by "one" to the second output cycle 206.

As it is further illustrated in section 1203, another one of the three network packets 104 that relate to demand "2" and are received during the burst condition is moved from cycle 1 to cycle 3. That is, this network packet 104 was received in the first input cycle 105 and will be output in the third output cycle 206. Node b (i.e. the network device 100) can base this decision in particular on the arrival cycle field 601 and on the cycle shift identifier 604' of the SR policy 600 shown in FIG. 12. The cycle shift identifier 604' being set to "2" in particular indicates that the network packet 104 is shifted from the first input cycle 105 by "two" to the third output cycle 206.

Thereby, shifting network packets 104 to output cycles 206, depending on their respective input cycle 105 is enabled.

As it is further shown in FIG. 12, the load balance type identifier 605 is set to "1", indicating that the SR policy 600 of FIG. 12 is for burst protection. For ease of illustration, the SR policy 600 of FIG. 12 only covers demand "2".

In other words, the exceeding traffic of the burst is distributed over the 3 cycles putting 1 packet per cycle. According to the SR policy 600, traffic is then split equally between d-e and d-f links. This is done e.g. according to the operating manner which is described in view of FIG. 11.

Without the solution provided by the network device 100, the burst could not be accepted on link d-f due to the presence of demand 1. The possibility of spreading bursts over multiple cycles allows for a better link utilization.

FIG. 13 illustrates how failure protection is provided using an SR policy 600 that implements cycle-level load balancing. The SR policy 600 is used to switch traffic from the d-e link to the d-g link when the failure $f_1$ is detected between node d and node e.

As it is shown in FIG. 13, the load balance type identifier 605 is set to "2", indicating that the SR policy 600 of FIG. 13 is for failure protection. That is, the load balance type identifier 605 can be the failure condition identifier 209. In other words, in reaction to a failure condition $f_1$ being determined by the network device 100, the SR policy 600 comprising the failure condition identifier 209 is used.

In FIG. 13, forwarding network packets 104 during a failure condition is illustrated by means of table 1301. The description of table 1100 in FIG. 11 also applies to table 1301 of FIG. 13.

Once a failure condition $f_1$ is detected by node d (i.e. the network device 100), the load balance type identifier 605 of the SR policy being set to "2" indicates that this SR policy 600 is used for mitigating the failure condition.

As it is indicated in table 1301, in cycle 1, two network packets 104 relating to demand "2" are forwarded from node d to node g. Node d can base this decision in particular on the arrival cycle field 601 and on the SID list 602 (in particular SID "60002"). The output load field 603 being "2" indicates that two network packets 104 are sent in cycle 1.

As it is further indicated in table 1301, in cycle 2, two network packets 104 relating to demand "2" are forwarded from node d to node g. Node d can base this decision in particular on arrival cycle field 601' and on the SID list 602'

(in particular SID "60003"). The output load field 603' being "2" indicates that two network packets 104 are send in cycle 2.

As it is further indicated in table 1301, in cycle 3, two network packets 104 relating to demand "2" are forwarded from node d to node g. Node d can base this decision in particular on arrival cycle field 601" and on the SID list 602" (in particular SID "60004"). The output load field 603" being "2" indicates that two network packets 104 are send in cycle 3.

In other words, the SR policy 600 can specify, which SID list 602, 602', 602" to use in case of a failure condition $f_1$ and depending on an input cycle 105.

Figure 14:
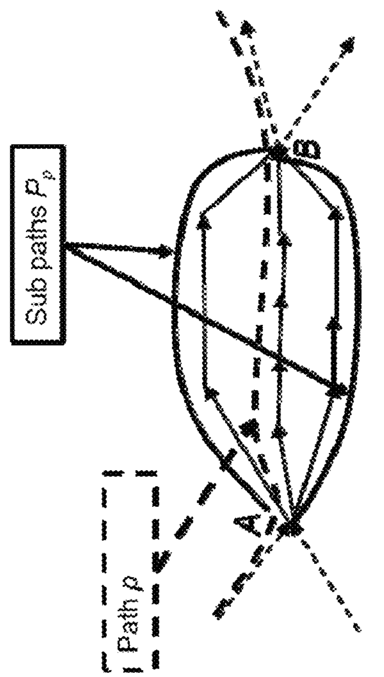
FIG. 14 shows a schematic view of a load balancing path computation algorithm.

FIG. 14 shows a path computation algorithm which can be used for load balancing. As shown in FIG. 14, for each demand d, the algorithm performs the following steps:

compute a path p with a maximum cycle length respecting a predefined QoS/QoE;

for each couple of nodes in the path p, compute k sub paths $P_p$ (e.g., k-shortest paths or k maximally disjoint shortest paths) that respect the QoS/QoE respected by path p between these two nodes, wherein all computed paths $P_p$ are valid to ensure no jitter and packet loss by using buffer to ensure the reordering;

assign the traffic on the selected sub-paths such that the maximum cycle utilization of all links is minimum and the number of used sub-paths is limited; and send the resulting load balancing policy 101 to the network device 100 for updating the flow tables 400, respectively, the SR policies 600.

The size of the burst to be installed is computed, for instance, as Max #packets by cycle×(Cycle length (primary path)−Cycle length (smallest backup path)−(#queues for DetNet−1)).

FIG. 15 shows segment routing of demands $d_1$, $d_2$ and $d_3$ (in section 1501) and mitigating a burst condition for demand $d_2$ (in section 1502).

In the network shown in section 1501, demand $d_1$ is routed from node a to node h, carrying a number of three network packets 104 in each of cycles 1, 2 and 3. In the same network, demand $d_2$ is routed from node b to node h, carrying a number of two network packets 104 in each of cycles 1, 2 and 3. Further, demand $d_3$ is routed from node c to node h, carrying a number of three network packets 104 in each of cycles 1, 2 and 3. The routing is in particular performed in line with the description of FIG. 11, more specifically section 1100.

As illustrated in section 1502, at node d (which implements the network device 100), a burst of network packets 104 appears for demand $d_2$. While in section 1501, two network packets 104 were present in cycle 1 of demand $d_2$, in section 1502, six network packets 104 need to be forwarded in cycle 1 at node d. This burst of six network packets 104 is mitigated by applying the teaching of FIG. 12 to the demand $d_2$—a first time at node d, and a second time at node f. Each time, one network packet is shifted from cycle 1 to cycle 2, and another network packet is shifted from cycle 1 to cycle 3. This is illustrated by reference signs 1201, 1202 and 1203 in FIG. 15. Thereby, the burst is mitigated and does not affect node h.

The following burst protection path computation algorithm can e.g. be applied in line with the teaching of FIG. 12 or FIG. 15. The following steps can be performed for path computation (wherein $P_d$, e.g., can be a set of alternative sub paths for a demand d calculated in the algorithm according to FIG. 14):

for each path p in $P_d$, compute a maximum burst absorption;

if a burst appears on demand d, then load balance the burst of the demand d such that the burst absorption is still minimum; and send the resulting load balancing policy 101 to the network device 100 for updating the flow tables 400, respectively, the SR policies 600.

Figure 16:
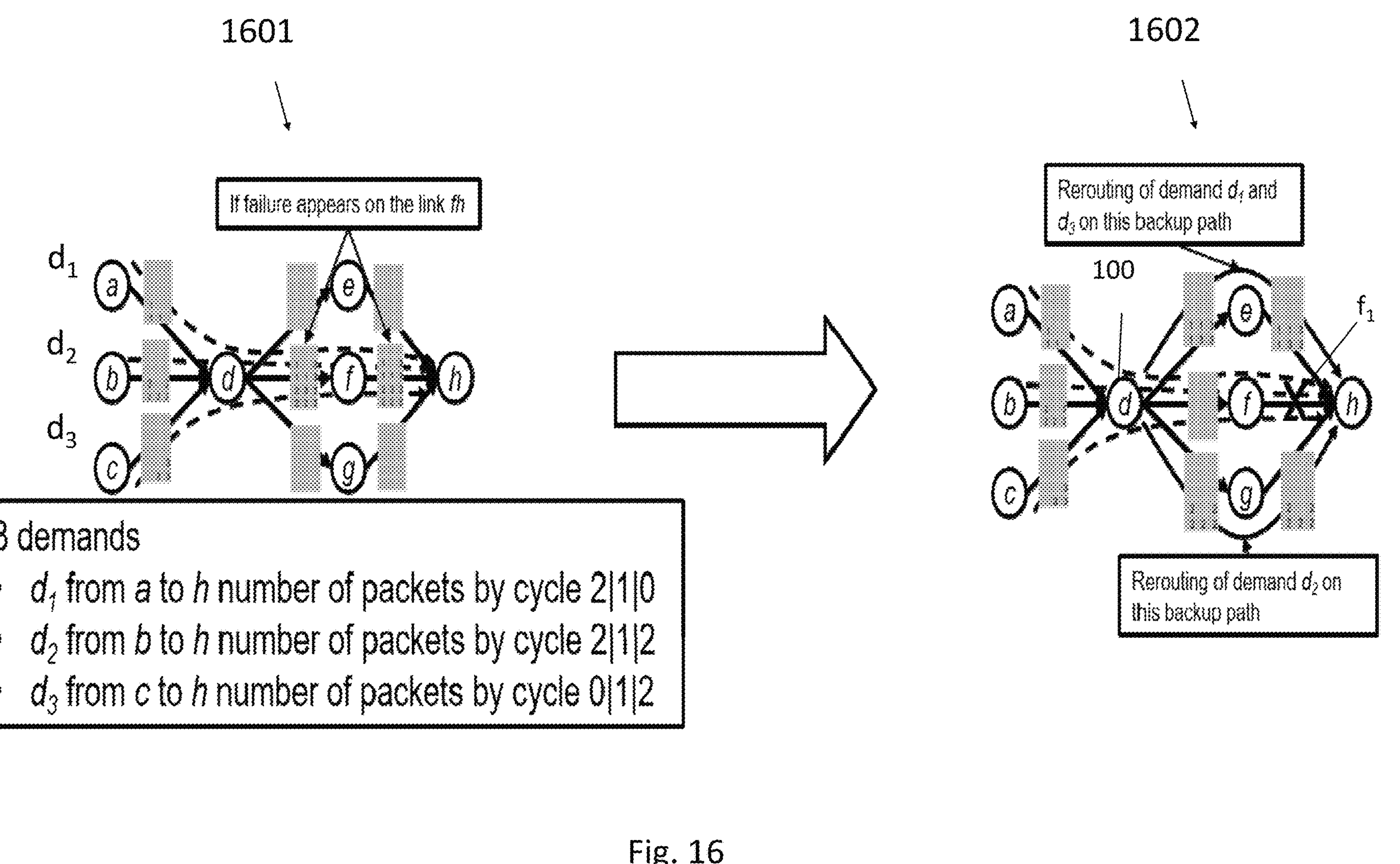
FIG. 16 shows a schematic view of a failure recovery path computation algorithm.

FIG. 16 shows segment routing of demands $d_1$, $d_2$ and $d_3$ (in section 1601) and mitigating a network failure for demand $d_2$ (in section 1602).

In the network shown in section 1601, demand $d_1$ is routed from node a to node h, carrying zero network packets 104 in cycle 1, one network packet 104 in cycle 2 and two network packets 104 in cycle 3. In the same network, demand $d_2$ is routed from node b to node h, carrying two network packets 104 in cycle 1, one network packet 104 in cycle 2 and two network packets 104 in cycle 3. Further, demand $d_3$ is routed from node c to node h, carrying two network packets 104 in cycle 1, one network packet 104 in cycle 2 and zero network packets 104 in cycle 3. The routing is in particular performed in line with the description of FIG. 11, more specifically section 1100.

As illustrated in section 1602, in the path starting at node d (which implements the network device 100) and reaching node h via node f, a failure $f_1$ appears. This failure is mitigated by rerouting demands $d_1$ and $d_3$ via nodes d, e and h, and by rerouting demand $d_2$ via nodes d, g and h. In both cases, the rerouting is implemented by applying the teaching of FIG. 13.

The following failure recovery path computation algorithm can be applied in line with the teaching of FIG. 13 or FIG. 16. The following steps can be performed (wherein Pd, e.g., can be a set of alternative paths for a demand d calculated in the algorithm according to FIG. 14):

for all paths which include a faulty set of links, call a rerouting procedure;

perform a rerouting procedure for a path p of a demand d to avoid the faulty set of links;

find a backup path p' in $P_d$ avoiding the faulty set of links;

reroute all network packets of d affected by the faulty set of links on the set of backup paths p' respecting the sequence of the network packets; and send the resulting load balancing policy 101 to the network device 100 for updating the flow tables 400, respectively, the SR policies 600.

The load balancing policy 101 can, e.g., be determined in the network device 100 according to any one of the above algorithms. According to these algorithms, the load balancing policy 101 can also be obtained outside the network device 100, e.g., in a network controller. Then, the load balancing policy 101 can be received in the network device 100 from the network controller.

Figure 17:
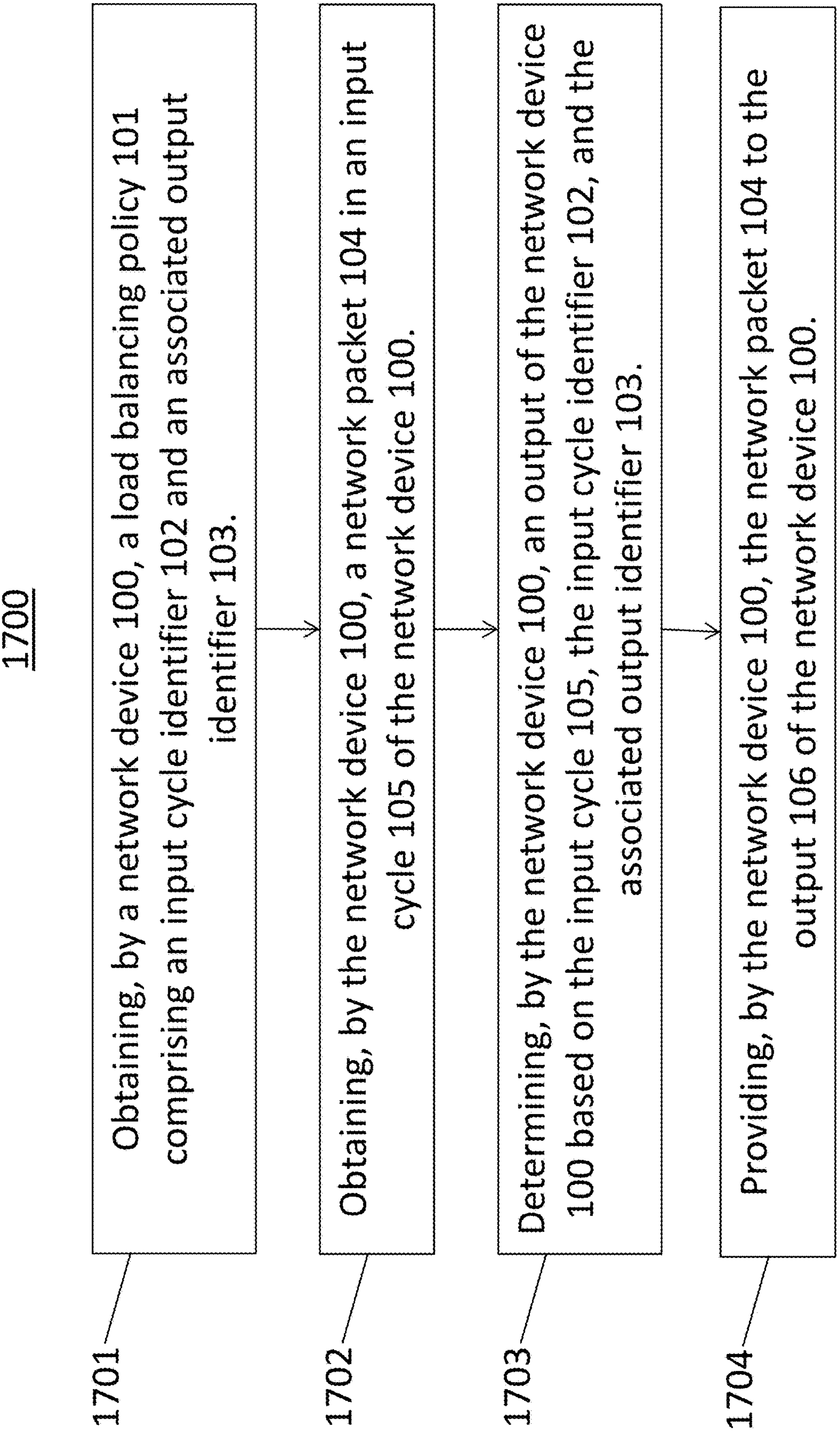
FIG. 17 shows a schematic view of a method according to an embodiment of the present disclosure.

FIG. 17 shows a method 1700 for cycle-based load balancing according to an embodiment of the present disclosure. The method 1700 for cycle-based load balancing comprises a first step of obtaining 1701, by a network device 100, a load balancing policy 101 comprising an input cycle identifier 102 and an associated output identifier 103. The method 1700 comprises a second step of obtaining 1702, by the network device 100, a network packet 104 in an input cycle 105 of the network device 100. The method 1700 comprises a third step of determining 1703, by the network device 100, an output of the network device 100 based on the input cycle 105, the input cycle identifier 102, and the associated output identifier 103. The method 1700 ends with a last step of providing 1704, by the network device 100, the network packet 104 to the output 106 of the network device 100.

Figure 18:
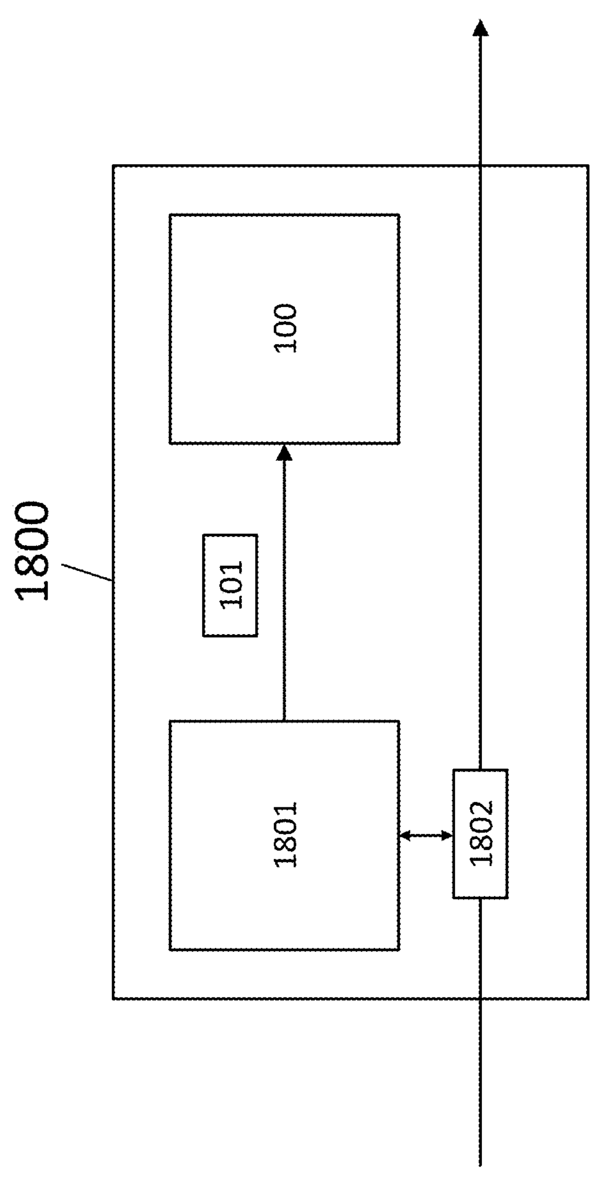
FIG. 18 shows a schematic view of a system according to an embodiment of the present disclosure.

FIG. 18 shows a system 1800 for cycle-based load balancing. The system 1800 comprises the network device 100 as described in any one of the above figures. The system 1800 further comprises a network controller 1801, configured to generate the load balancing policy 101 based on network traffic 1802 monitored by the network controller 1801 and to provide the load balancing policy 101 to the network device 100.

Figure 19:
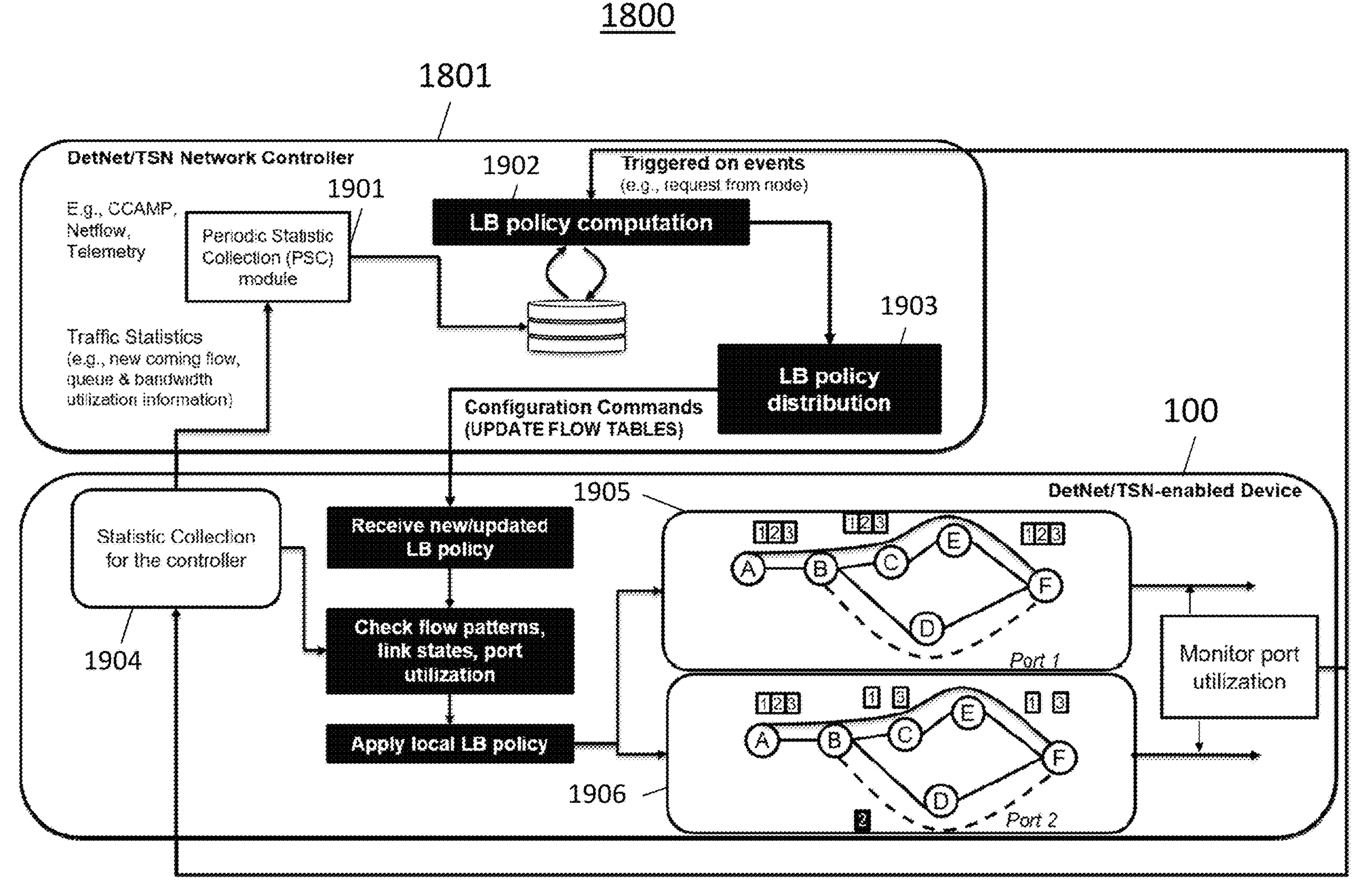
FIG. 19 shows a schematic view of a system according to an embodiment of the present disclosure in more detail.

A more detailed manner of the system 1800 is shown in FIG. 19, which is described in the following.

FIG. 19 shows a system 1800 for cycle-based load balancing in more detail. In FIG. 19, the controller 1801 (which e.g. can be a DetNet or TSN Network Controller) collects (e.g. by means of a periodic statistic collection (PSC) module 1901) traffic or traffic statistics from a network using standard protocols such as Common Control and Measurement Plane (CCAMP), NetFlow or Telemetry. Traffic statistics may include information regarding a new incoming flow, or information regarding queue & bandwidth utilization. The network traffic and/or the traffic statistics can also be received from the network device 100. To this end, the network device 100 employs a network statistic and traffic collection module 1904 which can send this information to the controller 1801.

By using the traffic or traffic statistics, a load balancing policy computation module 1902 of the controller 1801 can determine new configurations (that is, a load balancing policy 101 e.g. used for a flow table 400 update or an SR policy 600 update). Determining these configurations can e.g. be triggered by an event (e.g. a request from a node, for instance the network device 100). The new configuration then can be deployed to the network device 100, e.g. by means of a load balancing policy distribution module 1903. The load balancing policy distribution module 1903 is in charge of updating the load balancing policies 101 (including for instance the flow table 400 or the SR policy 600) of the relevant network device 100. These load balancing policies 101 can be sent to the network device 100 (e.g. implemented in a DetNet or TSN device) via standard messages.

Once the network device 100 has received the new load balancing policy 101, it can update its local load balancing policy 101 (e.g. its flow table 400, or SR policy 600) accordingly. The network device 100 may the check a flow pattern, a link state or a port condition in network traffic, and may decide to apply the load balancing policy 101 received from the network controller 1801 and apply it according to measured environmental network conditions. Applying the load balancing policy 101 is in particular illustrated in section 1905 and section 1906 of FIG. 19. Sections 1905 and 1906 specifically show how a network packet 104 of cycle 2 is load-balanced over path B, D, F. The network device 100 is also responsible for monitoring port utilization and reporting of collected statistics to the controller (e.g. done by the network statistic and traffic collection module 1904).

Figure 20:
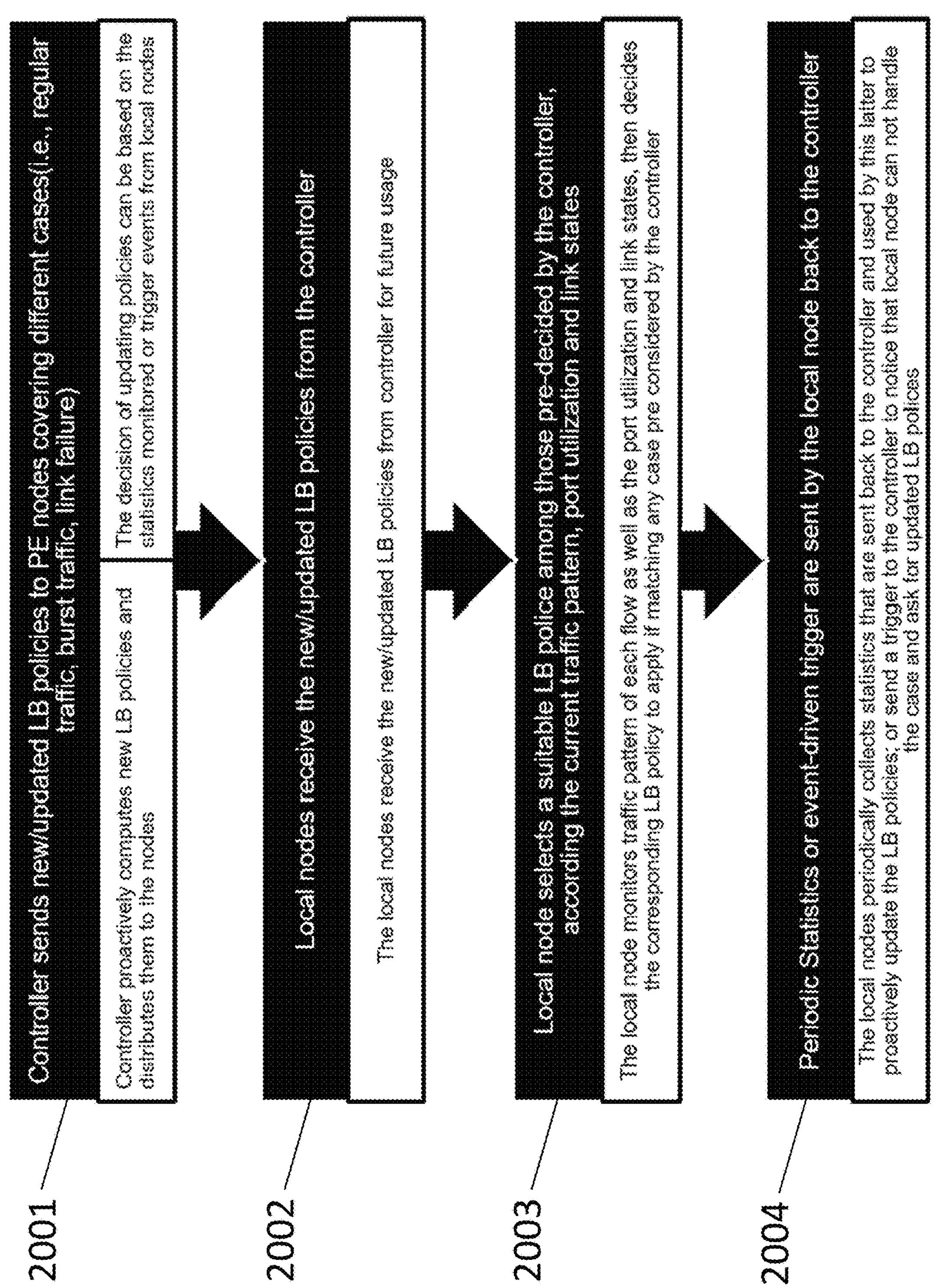
FIG. 20 shows a schematic view of an operating scenario of the system according to an embodiment of the present disclosure.

A general process followed to decide if and which load balancing policy 101 needs to be applied is shown in FIG. 20. In step 2001, the network controller 1801 proactively computes and sends new or updated load balancing policies 101 to PE nodes (i.e. to network nodes 100). The computation of new load balancing policies 101 is based on network statistics and can be used to solve the load balancing, the burst protection, or the failure recovery problem. As the network controller 1801 has a full network view, it must ensure that the load balancing policies 101 do not introduce interference between flows. In step 2002, the new load balancing policies 101 are stored in the network node (i.e. the network device 100) for future use. Based on currently observed statistics, the network device 100 decides which policy to apply in step 2003. The nodes, which are also responsible for collecting statistics, send updated information on monitored traffic to the network controller 1801 in step 2004. This can be done on a periodical basis or it can be triggered by particular events such as the absence of a load balancing policy 101 for a new incoming flow.

In a specific embodiment, local nodes (i.e. local network devices 100) can compute their local load balancing policies 101 and modify their traffic routing. This can be done under the assumption that local nodes have enough information (for instance from a network controller 1801) to take decisions that guarantee deterministic performance of a network. In the case of flow tables 400, intermediary nodes can modify the forwarding rules, while in the case of SR policies 600, the nodes can modify the list of SR headers via a pop operation.

The present invention has been described in conjunction with various embodiments as examples as well as implementations. However, other variations can be understood and effected by those persons skilled in the art and practicing the claimed invention, from the studies of the drawings, this disclosure, and the independent claims. In the claims as well as in the description, the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A network device, comprising:

at least one processor; and a non-transitory computer readable storage medium storing a program that is executable by the at least one processor, the program including instructions to:

obtain a segment routing (SR) load balancing policy, wherein the SR load balancing policy comprises a plurality of arrival cycle identifiers, each arrival cycle identifier is associated with a respective list of IDs in the SR load balancing policy, each arrival cycle identifier is further associated with a respective load distribution indicator, the network device cycles through a plurality of load balancing cycles over time, and the plurality of arrival cycle identifiers correspond to different load balancing cycles of the plurality of load balancing cycles;

obtain a network packet in a first arrival cycle of the network device, wherein the network packet belongs to a first flow and a flow identifier of the first flow doesn't change in the plurality of load balancing cycles;

determine an output of the network device based on the first arrival cycle, the plurality of arrival cycle identifiers, and the lists of IDs associated with the plurality of arrival cycle identifiers; and provide the network packet to the output of the network device.

2. The network device according to claim 1, wherein determining the output of the network device based on the first arrival cycle, the plurality of arrival cycle identifiers, and the lists of IDs associated with the plurality of arrival cycle identifiers, comprises:

determining the output of the network device based on the first arrival cycle, the plurality of arrival cycle identifiers, the lists of IDs associated with the plurality of arrival cycle identifiers, and the load distribution indicators associated with the plurality of arrival cycle identifiers.

3. The network device according to claim 2, wherein each load distribution indicator comprises an output load field in the SR load balancing policy; and wherein the program further includes instructions to:

determine an output load based on the output load fields associated with the plurality of arrival cycle identifiers.

4. The network device according to claim 1, wherein each list of IDs is a list of segment IDs.

5. The network device according to claim 1, wherein the output of the network device further comprises an output cycle, and each arrival cycle identifier is further associated with a respective output cycle identifier; and wherein the program further includes instructions to:

determine the output cycle based on the output cycle identifiers associated with the plurality of arrival cycle identifiers.

6. The network device according to claim 1, wherein the SR load balancing policy further comprises a burst condition identifier associated with the plurality of arrival cycle identifiers;

wherein the program includes instructions to:

in response to a burst of network packets being received, determine the output of the network device based on the burst condition identifier.

7. The network device according to claim 1, wherein the SR load balancing policy further comprises a failure condition identifier associated with the plurality of arrival cycle identifiers; and wherein the program further includes instructions to:

in reaction to a failure condition being determined by the network device, determine the output of the network device based on the failure condition identifier.

8. The network device according to claim 1, wherein the SR load balancing policy further comprises a load balancing condition identifier associated with the plurality of arrival cycle identifiers; and wherein the program further includes instructions to:

determine the output of the network device based on the load balancing condition identifier.

9. The network device according to claim 1, wherein the program further includes instructions to:

determine the SR load balancing policy.

10. A method, the method comprising:

obtaining, by a network device, a segment routing (SR) load balancing policy, wherein the SR load balancing policy comprises a plurality of arrival cycle identifiers, and each arrival cycle identifier is associated with a respective list of IDs in the SR load balancing policy, each arrival cycle identifier is further associated with a respective load distribution indicator, the network device cycles through a plurality of load balancing cycles over time, and the plurality of arrival cycle identifiers correspond to different load balancing cycles of the plurality of load balancing cycles;

obtaining, by the network device, a network packet in a first arrival cycle of the network device, wherein the network packet belongs to a first flow and a flow identifier of the first flow doesn't change in the plurality of load balancing cycles;

determining, by the network device, an output of the network device based on the first arrival cycle, the plurality of arrival cycle identifiers, and the lists of IDs associated with the plurality of arrival cycle identifiers; and providing, by the network device, the network packet to the output of the network device.

11. The method according to claim 10, wherein determining the output of the network device based on the first arrival cycle, the plurality of arrival cycle identifiers, and the lists of IDs associated with the plurality of arrival cycle identifiers, comprises:

determining the output of the network device based on the first arrival cycle, the plurality of arrival cycle identifiers, the lists of IDs associated with the plurality of arrival cycle identifiers, and the load distribution indicators associated with the plurality of arrival cycle identifiers.

12. A non-transitory computer-readable storage medium comprising instructions which, when executed by a computer, cause the computer to:

obtain a segment routing (SR) load balancing policy, wherein the SR load balancing policy comprises a plurality of arrival cycle identifiers, each arrival cycle identifier is associated with a list of IDs in the SR load balancing policy, each arrival cycle identifier is further associated with a respective load distribution indicator, a network device to which the computer is applied cycles through a plurality of load balancing cycles over time, and the plurality of arrival cycle identifiers correspond to different load balancing cycles of the plurality of load balancing cycles;

obtain a network packet in a first arrival cycle of the network device, wherein the network packet belongs to a first flow and a flow identifier of the first flow doesn't change in the plurality of load balancing cycles;

determine an output of the network device based on the first arrival cycle, the plurality of arrival cycle identifiers, and the lists of IDs associated with the plurality of arrival cycle identifiers; and provide the network packet to the output of the network device.

13. The method according to claim 10, wherein each load distribution indicator comprises an output load field in the SR load balancing policy; and wherein the method further comprises:

determining an output load based on the output load fields associated with the plurality of arrival cycle identifiers.

14. The method according to claim 10, wherein each list of IDs is a list of segment IDs.

15. The non-transitory computer-readable storage medium according to claim 12, wherein determining the output of the network device based on the first arrival cycle, the plurality of arrival cycle identifiers, and the lists of IDs associated with the plurality of arrival cycle identifiers, comprises:

determining the output of the network device based on the first arrival cycle, the plurality of arrival cycle identifiers, the lists of IDs associated with the plurality of arrival cycle identifiers, and the load distribution indicators associated with the plurality of arrival cycle identifiers.

16. The non-transitory computer-readable storage medium according to claim 15, wherein each load distribution indicator comprises an output load field in the SR load balancing policy; and wherein the instructions, when executed by the computer, cause the computer to:

determine an output load based on the output load fields associated with the plurality of arrival cycle identifiers.

17. The non-transitory computer-readable storage medium according to claim 12, wherein each list of IDs is a list of segment IDs.

18. The network device according to claim 1, wherein the program further includes instructions to:

obtain the SR load balancing policy from a network controller.

19. The method according to claim 10, wherein the output of the network device further comprises an output cycle, and each arrival cycle identifier is further associated with a respective output cycle identifier; and wherein the method further comprises:

determining the output cycle based on the output cycle identifiers associated with the plurality of arrival cycle identifiers.

20. The non-transitory computer-readable storage medium according to claim 12, wherein the output of the network device further comprises an output cycle, and each arrival cycle identifier is further associated with a respective output cycle identifier; and wherein the instructions, when executed by the computer, cause the computer to:

determine the output cycle based on the output cycle identifiers associated with the plurality of arrival cycle identifiers.

* * * * *